US011347888B2

(12) United States Patent
Su et al.

(10) Patent No.: US 11,347,888 B2
(45) Date of Patent: May 31, 2022

(54) BLOCKCHAIN-BASED USER PRIVACY DATA PROVIDING METHODS AND APPARATUSES

(71) Applicant: ALIPAY (HANGZHOU) INFORMATION TECHNOLOGY CO., LTD., Zhejiang (CN)

(72) Inventors: Dexin Su, Hangzhou (CN); Jun Gu, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,890

(22) Filed: Jun. 29, 2021

(65) Prior Publication Data

US 2021/0326476 A1   Oct. 21, 2021

(30) Foreign Application Priority Data

Sep. 11, 2020   (CN) .......................... 202010953541.1

(51) Int. Cl.
*H04L 29/06* (2006.01)
*G06F 21/62* (2013.01)
(Continued)

(52) U.S. Cl.
CPC .......... *G06F 21/6245* (2013.01); *G06F 21/57* (2013.01); *G06F 21/602* (2013.01)

(58) Field of Classification Search
CPC ..... G06F 21/6245; G06F 21/57; G06F 21/602
See application file for complete search history.

(56) References Cited

U.S. PATENT DOCUMENTS

2019/0122317 A1*   4/2019   Hunn ................... H04L 9/0637
2020/0169407 A1*   5/2020   Wei ........................ G06F 21/64
(Continued)

FOREIGN PATENT DOCUMENTS

| CN | 107622385 | 1/2018 |
| CN | 108717861 | 10/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Jason K Gee
(74) *Attorney, Agent, or Firm* — Fish & Richardson P.C.

(57) ABSTRACT

A blockchain-based user privacy data providing method and apparatus is provided. The method includes receiving a data consumption request from a data consumer, where the data consumption request requests user privacy data of a target user, the user privacy data includes personal data that is pre-encrypted and uploaded to a trusted execution environment (TEE), and the TEE is constructed in a blockchain node; performing predetermined verification on the data consumption request in the TEE based on request body data corresponding to the data consumption request using a smart contract deployed in the blockchain to obtain a corresponding predetermined verification result; if the predetermined verification result satisfies a verification success condition, obtaining target privacy data for the data consumption request, and sending the encrypted target privacy data to the data consumer, where the target privacy data is obtained in the TEE based on the user privacy data stored in the blockchain.

25 Claims, 9 Drawing Sheets

(51) Int. Cl.
   *G06F 21/57*  (2013.01)
   *G06F 21/60*  (2013.01)

(56) References Cited

U.S. PATENT DOCUMENTS

2020/0313902 A1* 10/2020 Yu .............................. H04L 9/30
2020/0342092 A1* 10/2020 Wei ..................... G06F 21/6218

FOREIGN PATENT DOCUMENTS

| CN | 110086804 | 8/2019 |
| CN | 110580245 | 12/2019 |
| CN | 111431936 | 7/2020 |
| CN | 111475850 | 7/2020 |

OTHER PUBLICATIONS

Nakamoto, "Bitcoin: A Peer-to-Peer Electronic Cash System," www.bitcoin.org, 2005, 9 pages.

Extended European Search Report in European Application No. 21182369.5, dated Dec. 17, 2021, 12 pages.

Sony.net [online], "Sony Global Education Develops Technology Using Blockchain for Open Sharing of Academic Proficiency and Progress Records," Feb. 22, 2016, retrieved on Mar. 29, 2017, retrieved from URL<http://www.sony.net/SonyInfo/News/Press/201602/16-0222E/index.html>, 3 pages.

* cited by examiner

BLOCKCHAIN-BASED USER PRIVACY DATA PROVIDING METHODS AND APPARATUSES

CROSS-REFERENCE TO RELATED APPLICATIONS

This application claims priority to Chinese Patent Application No. 202010953541.1, filed on Sep. 11, 2020, which is hereby incorporated by reference in its entirety.

TECHNICAL FIELD

The present specification relates to the field of computers, and in particular, to blockchain-based user privacy data providing methods and apparatuses.

BACKGROUND

At present, with the rapid development of Internet data service technologies and the increasingly improved digital credentials, it is important that data consumers can quickly and conveniently query personal data generated by target users in a specified industry. For example, employers need to quickly query user education data (such as an educational experience) of applicants, and these data providing services also become a noteworthy service scenario.

For example, the specified industry is an education industry. The user education data can reflect a service capability of a user to a certain extent, but the education data relates to related privacies of the user and belongs to user privacy data. However, in existing solutions for providing privacy data such as user education data, the user privacy data has poor confidentiality and low security. This may cause a risk of leaking the user privacy data, and inevitably brings unnecessary troubles to the user.

It can be seen that a privacy data providing technical solution with high security for protecting user's privacy is needed.

SUMMARY

One or more embodiments of the present specification are intended to provide a blockchain-based user privacy data providing method. The blockchain-based user privacy data providing method includes the followings: a data consumption request sent by a data consumer is received, where the data consumption request is a consumption request aiming at user privacy data of a target user, the user privacy data includes personal data that is pre-encrypted and is uploaded to a trusted execution environment (TEE), and the TEE is constructed in a node of a blockchain; predetermined verification is performed on the data consumption request in the TEE based on request body data corresponding to the data consumption request by using a smart contract deployed in the blockchain, to obtain a corresponding predetermined verification result; and if the predetermined verification result satisfies a verification success condition, target privacy data obtained for the data consumption request is obtained, and the encrypted target privacy data is sent to the data consumer, where the target privacy data is obtained in the TEE based on the user privacy data stored in the blockchain.

One or more embodiments of the present specification are intended to provide a blockchain-based user privacy data providing apparatus. The blockchain-based user privacy data providing apparatus includes: a consumption request acquisition module, configured to receive a data consumption request sent by a data consumer, where the data consumption request is a consumption request aiming at user privacy data of a target user, the user privacy data includes personal data that is pre-encrypted and is uploaded to a TEE, and the TEE is constructed in a node of a blockchain; an information verification module, configured to perform predetermined verification on the data consumption request in the TEE based on request body data corresponding to the data consumption request by using a smart contract deployed in the blockchain, to obtain a corresponding predetermined verification result; and a data providing module, configured to: if the predetermined verification result satisfies a verification success condition, obtain target privacy data obtained for the data consumption request, and send the encrypted target privacy data to the data consumer, where the target privacy data is obtained in the TEE based on the user privacy data stored in the blockchain.

One or more embodiments of the present specification are intended to provide a blockchain-based user privacy data providing device, including a processor, and a memory configured to store computer executable instructions.

When the computer executable instructions are being executed, the processor is enabled to: receive a data consumption request sent by a data consumer, where the data consumption request is a consumption request aiming at user privacy data of a target user, the user privacy data includes personal data that is pre-encrypted and is uploaded to a TEE, and the TEE is constructed in a node of a blockchain; perform predetermined verification on the data consumption request in the TEE based on request body data corresponding to the data consumption request by using a smart contract deployed in the blockchain, to obtain a corresponding predetermined verification result; and if the predetermined verification result satisfies a verification success condition, obtain target privacy data obtained for the data consumption request, and send the encrypted target privacy data to the data consumer, where the target privacy data is obtained in the TEE based on the user privacy data stored in the blockchain.

One or more embodiments of the present specification are intended to provide a storage medium, configured to store computer executable instructions. When the computer executable instructions are executed by a processor, the following method is implemented: a data consumption request sent by a data consumer is received, where the data consumption request is a consumption request aiming at user privacy data of a target user, the user privacy data includes personal data that is pre-encrypted and is uploaded to a TEE, and the TEE is constructed in a node of a blockchain; predetermined verification is performed on the data consumption request in the TEE based on request body data corresponding to the data consumption request by using a smart contract deployed in the blockchain, to obtain a corresponding predetermined verification result; and if the predetermined verification result satisfies a verification success condition, target privacy data obtained for the data consumption request is obtained, and the encrypted target privacy data is sent to the data consumer, where the target privacy data is obtained in the TEE based on the user privacy data stored in the blockchain.

BRIEF DESCRIPTION OF DRAWINGS

To describe one or more embodiments of the present specification or the technical solutions in the existing technology more clearly, the following briefly introduces the accompanying drawings for describing the embodiments or the existing technology. Clearly, the accompanying drawings in the following description merely show some embodiments described in one or more embodiments of the present specification, and a person of ordinary skill in the art can still derive other drawings from these accompanying drawings without creative efforts.

DESCRIPTION OF EMBODIMENTS

To make a person skilled in the art understand the technical solutions in one or more embodiments of the present specification better, the following clearly and comprehensively describes the technical solutions in the one or more embodiments of the present specification with reference to the accompanying drawings in the one or more embodiments of the present specification. Clearly, the described embodiments are merely some but not all of the embodiments of the present specification. All other embodiments obtained by a person of ordinary skill in the art based on the one or more embodiments of the present specification without creative efforts shall fall within the protection scope of the present specification.

It is worthwhile to note that one or more embodiments of the present specification and features of the embodiments can be combined with each other in case of no conflict. One or more embodiments of the present specification are described in detail below with reference to the accompanying drawings and the embodiments.

One or more embodiments of the present specification provide a blockchain-based user privacy data providing method and apparatus. Either in a data recording stage of user privacy data or in a data consumption stage of the user privacy data, corresponding data processing is performed by using a trusted execution environment (TEE) constructed in a node of a blockchain, and data is transmitted in a form of a ciphertext during data transmission process, to upload the user privacy data to the TEE of the blockchain, and return target privacy data to a data consumer, thereby externally providing a consumption service of the user privacy data. As such, security of the user privacy data in the data transmission process can be ensured, and security of the user privacy data on which data processing is performed on the blockchain can also be ensured, thereby ensuring security of the user privacy data generated by a user in a specified industry on the entire blockchain, and improving a security level of the user privacy data that is of the user and that is related to a personal experience in the specified industry.

Figure 1:
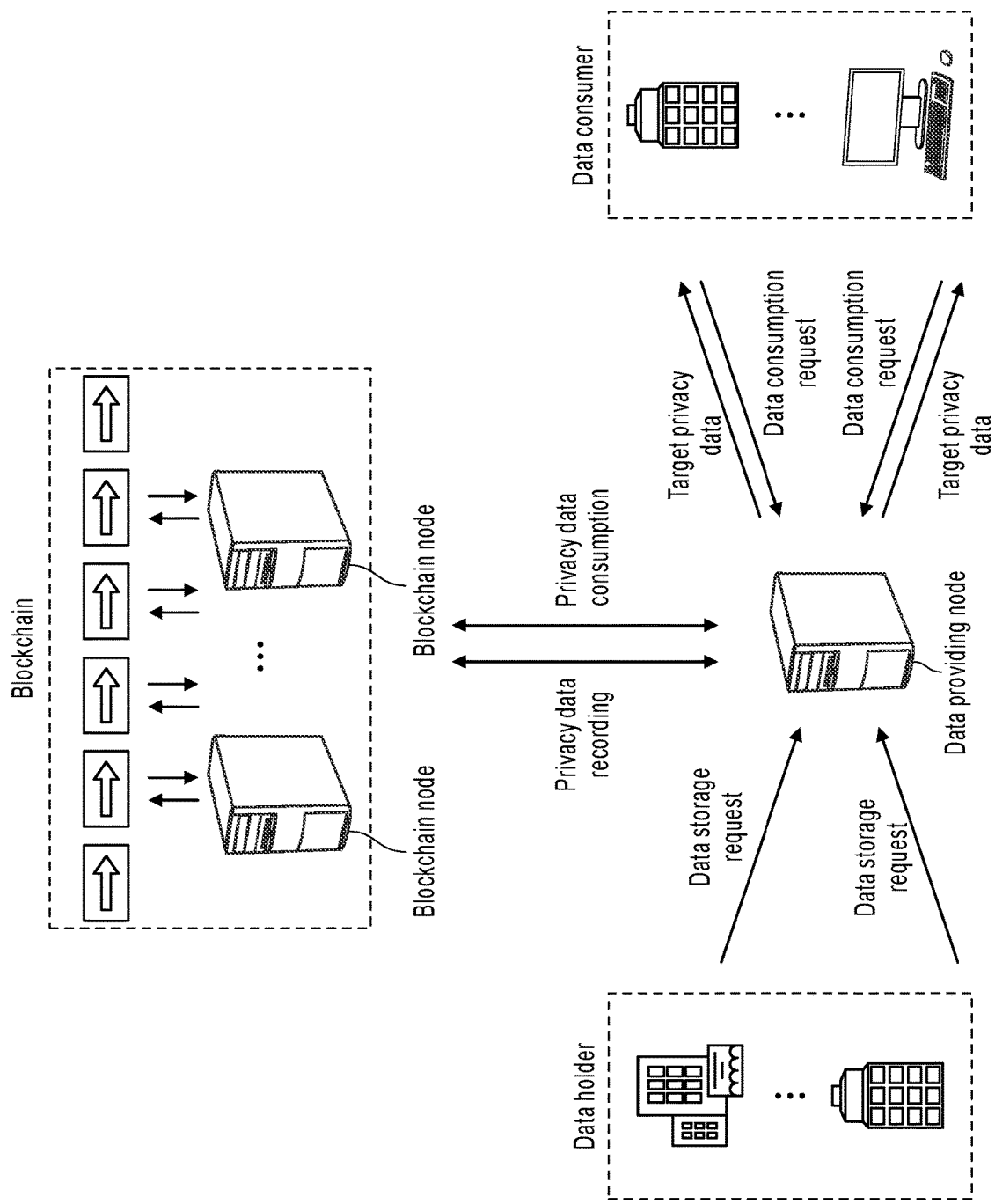
FIG. 1 is a schematic diagram illustrating an application scenario of a blockchain-based user privacy data providing system, according to one or more embodiments of the present specification.

FIG. 1 is a schematic diagram illustrating an application scenario of a blockchain-based user privacy data providing system, according to one or more embodiments of the present specification. As shown in FIG. 1, the system includes a data holder, a data consumer, a data providing node, and at least one blockchain node in a blockchain. A TEE is set in the blockchain node, i.e., trusted hardware providing safer space for data and code execution is set in the blockchain node. The data holder and the data consumer can be smartphones, tablet computers, and other mobile devices used by a target user, or can be an end-user device such as a computer used by a target institution. The data providing node can be an independent server or a server cluster including a plurality of servers. The data providing node can be any blockchain node in the blockchain, or an external trusted node other than the blockchain node. Considering that the data holder and the data consumer may not have the ability to directly connect to the blockchain node, preferably, the data providing node is an external trusted node that exchanges data with the blockchain node, to record information about user privacy data and externally provide a consumption service of the user privacy data. As such, a complicated interaction process between the blockchain and each of the data holder and the data consumer is omitted, and safe, reliable, convenient, and simple data providing services are provided for the data holder and the data consumer.

During specific implementation, any one of the data holder, the data consumer, the data providing node, and the blockchain node in the blockchain can be provided with the TEE and installed with a trusted application. Any end-user device or server provided with the TEE and installed with the trusted application can obtain externally transmitted data by using the trusted application and transmit the obtained data to the local TEE by using the trusted application, and can further send data to other end-user devices or servers by using the trusted application. A blockchain node provided with the TEE and installed with the trusted application is used as an example. In a user privacy data recording process, the blockchain node receives user privacy data to be recorded that is sent by the data providing node in a form of a ciphertext by using the trusted application, and transmits the user privacy data to be recorded to the local TEE to record the user privacy data in the TEE. Similarly, the data providing node provided with the TEE and installed with the trusted application can also receive user privacy data to be recorded that is sent by the data holder in a form of a ciphertext by using the trusted application, and transmits the user privacy data to be recorded to the local TEE to perform corresponding processing on the user privacy data in the TEE, for example, decrypt, perform security verification on, or encrypt the user privacy data.

Based on the schematic diagram illustrating the application scenario of the blockchain-based user privacy data providing system in FIG. 1, for example, the data providing node is an external trusted node other than the blockchain node, the blockchain-based user privacy data providing processes specifically includes the following:

The data holder sends a privacy data storage request of a target user to the data providing node. The privacy data storage request includes first encrypted data. The first encrypted data includes user privacy data to be recorded. The user privacy data can include personal data generated by the target user in a specified industry. For example, the specified industry is an education industry. The data holder includes a school attended by the user, a training institution attended by the user, a professional examination authority, and provincial and municipal human resources and social security bureaus. Correspondingly, the user privacy data can include user behavior data used to indicate an education experience of the target user, such as at least one of information about a school attended by the target user in each stage, information about training courses that the user participates in, information about obtained certificates, and score information of all taken examinations.

The data providing node receives the privacy data storage request from the data holder. The first encrypted data included in the privacy data storage request is obtained by encrypting plaintext user privacy data through envelope encryption.

The data providing node transmits the user privacy data to be recorded to the TEE based on the first encrypted data included in the privacy data storage request. The TEE is constructed in at least one blockchain node in the blockchain, and a first smart contract is deployed in the blockchain.

The at least one blockchain node in the blockchain records the user privacy data of the target user in the corresponding TEE by using the first smart contract deployed in the blockchain, to store the user privacy data of the target user to the TEE.

The data providing node receives a data consumption request sent by the data consumer after the user privacy data of the target user is stored to the TEE. The data consumption request is a consumption request aiming at the user privacy data of the target user, the user privacy data includes personal data that is pre-encrypted and is uploaded to the TEE, and the TEE is constructed in the at least one blockchain node in the blockchain.

The data providing node transmits request body data corresponding to the data consumption request to the TEE in the blockchain. A second smart contract is further deployed in the blockchain. Specifically, the data providing node can encrypt the request body data through envelope encryption, and transmit the encrypted request body data to the TEE in the blockchain, to trigger the blockchain node to return corresponding target privacy data.

The at least one blockchain node in the blockchain performs, in the corresponding TEE, predetermined verification on the data consumption request based on the request body data corresponding to the data consumption request by using the second smart contract deployed in the blockchain, to obtain a corresponding predetermined verification result. Specifically, considering that the request body data transmitted by the data providing node to the TEE can be encrypted through envelope encryption, correspondingly, the blockchain node needs to first obtain plaintext request body data through decryption, and then perform corresponding verification on the data consumption request based on the request body data, to determine whether to return the target privacy data requested by the data consumer.

If the predetermined verification result satisfies a verification success condition, the data providing node obtains the target privacy data obtained for the data consumption request of the data consumer, and sends the encrypted target privacy data to the data consumer. The target privacy data is obtained based on the user privacy data stored in the blockchain after the blockchain node determines in the TEE that the predetermined verification result satisfies the verification success condition. Correspondingly, the blockchain node sends the encrypted target privacy data to the data providing node, so that the data providing node returns the target privacy data to the data consumer.

In the previous application scenario, when the consumption service of the privacy data of the target user is externally provided, either in the data recording stage of the user privacy data or in the data consumption stage of the user privacy data, corresponding data processing is performed by using the TEE constructed in the node of the blockchain, and the data is transmitted in a form of a ciphertext, to upload the user privacy data to the TEE of the blockchain, and return the target privacy data to the data consumer, thereby externally providing the consumption service of the user privacy data. As such, the security of the user privacy data in the data transmission process can be ensured, and the security of the user privacy data on which data processing is performed on the blockchain can also be ensured, thereby ensuring the security of the user privacy data generated by the user in the specified industry on the entire blockchain, and improving the security level of the user privacy data that is of the user and that is related to a personal experience in the specified industry. Furthermore, all personal data of the target user in the specified industry is associated and integrated by using the blockchain, to conveniently provide user privacy data of the user at any time to the data consumer, thereby further improving providing efficiency of the user privacy data while the security of the user privacy data is ensured.

Figure 2:
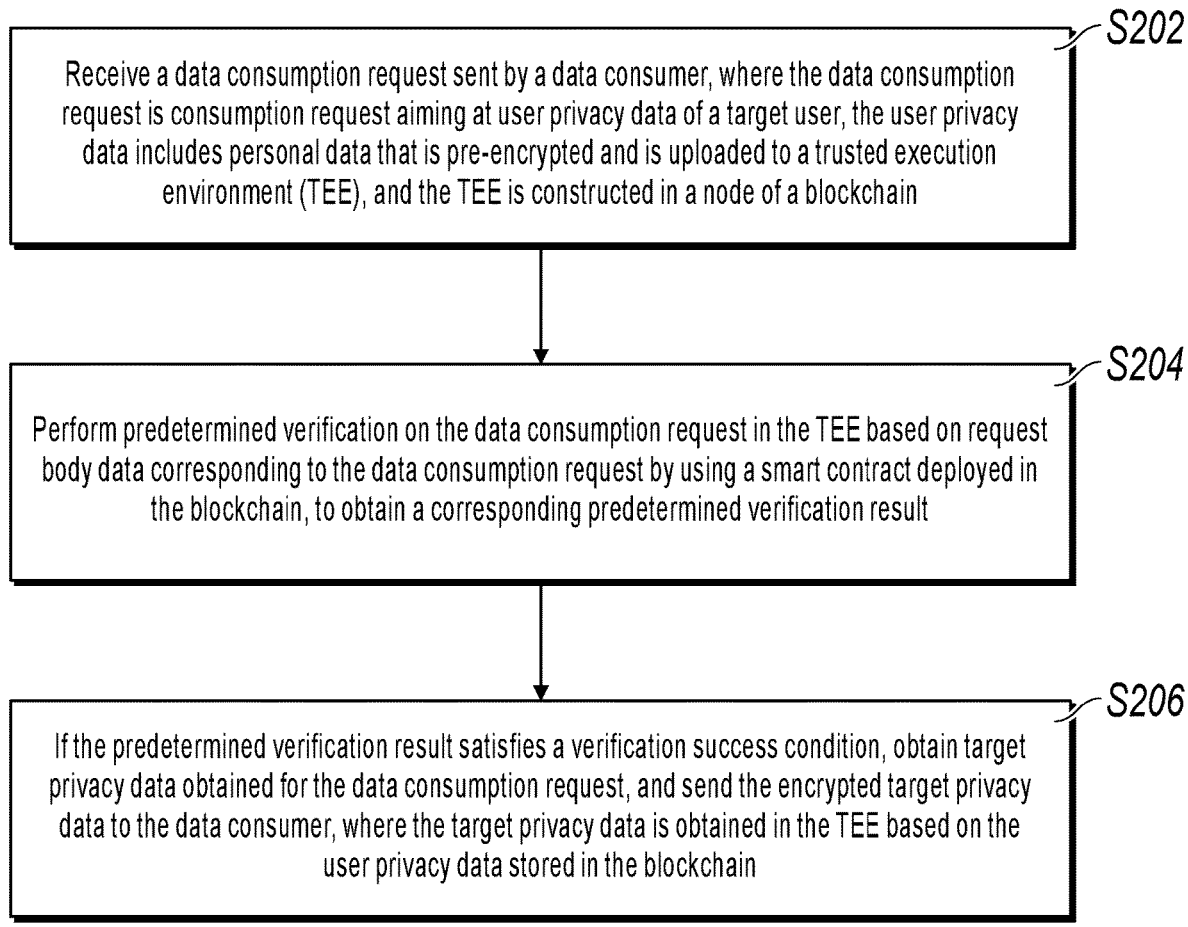
FIG. 2 is a first schematic flowchart illustrating a blockchain-based user privacy data providing method, according to one or more embodiments of the present specification.

FIG. 2 is a first schematic flowchart illustrating a blockchain-based user privacy data providing method, according to one or more embodiments of the present specification. As shown in FIG. 2, the method at least includes the following steps.

In S202, a data consumption request sent by a data consumer is received, where the data consumption request is a consumption request aiming at user privacy data of a target user, the user privacy data includes personal data that is pre-encrypted and is uploaded to a TEE, and the TEE is constructed in a node of a blockchain.

An education industry is used as an example. The previous user privacy data can include user behavior data used to indicate an education experience of the target user, such as at least one of information about a school attended by the target user in each stage, information about training courses that the user participates in, information about training institutions, information about obtained certificates, and score information of all taken examinations.

The previous blockchain can be a public blockchain or a consortium blockchain. Preferably, the previous blockchain is a consortium blockchain, and members that join the consortium blockchain can include: a related user or institution in a specified industry, and a data providing node. The related user or institution in the specified industry can be a data hoster, a data authenticator, a data holder, a data consumer, etc. that constitute a recording and consumption service network of the user privacy data. The user or institution that joins the consortium blockchain may have a plurality of roles, for example, an institution can be the data holder, the data consumer, the data authenticator, or the data hoster. Further, to ensure data security, a data recording service or a data consumption service is provided only to the user or the institution that joins the consortium blockchain. Each user or institution that joins the consortium blockchain is assigned with a unique on-chain account that is used to indicate unique identity information of the user or the institution that joins the consortium blockchain. Subsequently, the corresponding recording service or consumption service of the user privacy data is provided to the user or the institution based on the unique on-chain account of each consortium blockchain member. In addition, the previous data providing node can be any data hoster that joins the consortium blockchain.

In S204, predetermined verification is performed in the TEE on the data consumption request based on request body data corresponding to the data consumption request by using a smart contract deployed in the blockchain, to obtain a corresponding predetermined verification result, where the predetermined verification includes at least one of data privacy attribute verification, data hosting relationship verification, data authorization relationship verification, and consumption request type verification.

During specific implementation, the predetermined verification includes the data privacy attribute verification and the data hosting relationship verification if a data privacy level is lower than or equal to a first predetermined privacy level. The predetermined verification includes the data privacy attribute verification, the data hosting relationship verification, and the data authorization relationship verification if the data privacy level is higher than the first predetermined privacy level and lower than a second predetermined privacy level. The predetermined verification includes the data privacy attribute verification, the data hosting relationship verification, the data authorization relationship verification, and the consumption request type verification if the data privacy level is higher than or equal to the second predetermined privacy level.

Specifically, if the data providing node is an external trusted node, the data providing node transmits the request body data corresponding to the data consumption request to the TEE in the blockchain after receiving the data consumption request sent by the data consumer, so that at least one blockchain node in the blockchain performs predetermined verification on the data consumption request in the TEE based on the request body data by using the smart contract deployed in the blockchain, to obtain the corresponding predetermined verification result.

Further, to facilitate the blockchain node to quickly perform predetermined verification on the data consumption request, the previous request body data corresponding to the data consumption request is determined based on original request body data included in the data consumption request and the unique on-chain account of each member in the consortium blockchain. Specifically, the data providing node first determines target request body data based on the original request body data included in the data consumption request, and then transmits the target request body data to the TEE in the blockchain, so that the at least one blockchain node in the blockchain performs predetermined verification on the data consumption request in the TEE based on the target request body data by using the smart contract deployed in the blockchain, to obtain the corresponding predetermined verification result.

The previous original request body data includes at least one of identifier information of the data consumer, identifier information of the target user, and identifier information of data to be consumed. For example, the identifier information of the target user can include at least one of a student number, an identity card, and a name of the target user. The identifier information of the data to be consumed can include at least one of a validation period, a category, and data source information of the user privacy data. Correspondingly, the previous target request data can include at least one of a unique on-chain account of the data consumer, a unique on-chain account of a data holder of the data to be consumed, a unique on-chain account of the data hoster, and the identifier information of the data to be consumed.

For example, data consumer AA needs to query an academic result of a student with student number aaaa in the first semester at XXX University. The student can authorize education-related data of the student during the university to data consumer AA, and institution YYY can host the student for XXX University. Correspondingly, the previous original request body data includes identifier AA of the data consumer, student number aaaa of the target user, the validation period of the user privacy data to be consumed is the first semester at the university, the category is the academic result, and the data source information is XXX University. The previous target request data can include a least one of the unique on-chain account of data consumer AA, the unique on-chain account of data holder XXX University of the data to be consumed, the unique on-chain account of data hoster YYY, the identifier information of the target user, and the identifier information of the data to be consumed.

Specifically, the previous predetermined verification can include at least one of the data privacy attribute verification, the hosting relationship verification, and the authorization relationship verification. The smart contract deployed in the blockchain includes a predetermined verification rule. Predetermined verification on the data consumption request is automatically completed by using the smart contract; and whether to return the target privacy data to the data consumer is determined based on the predetermined verification result.

In S206, if the predetermined verification result satisfies a verification success condition, target privacy data obtained for the data consumption request is obtained, and the encrypted target privacy data is sent to the data consumer, where the target privacy data is obtained in the TEE based on the user privacy data stored in the blockchain.

The previous data consumption request includes a data query request, a data verification request, or a data proof request. Correspondingly, the previous target privacy data can be the user privacy data that the data consumer requests to query, an authenticity result of the user privacy data that the data consumer requests to verify, or proof information of the user privacy data that the data consumer requests to prove.

Specifically, if the data providing node is an external trusted node, the at least one blockchain node in the blockchain determines the target privacy data corresponding to the data consumption request of the data consumer after determining that the predetermined verification result satisfies the verification success condition, and sends the encrypted target privacy data to the data providing node. The data providing node receives the target privacy data returned by the blockchain node, and returns the target privacy data to the data consumer.

In one or more embodiments of the present specification, either in a data recording stage of user privacy data or in a data consumption stage of the user privacy data, corresponding data processing is performed by using the TEE constructed in the node of the blockchain, and data is transmitted in a form of a ciphertext, to upload the user privacy data to the TEE of the blockchain, and return the target privacy data to the data consumer, thereby externally providing the consumption service of the user privacy data. As such, security of the user privacy data in the data transmission process can be ensured, and security of the user privacy data on which data processing is performed on the blockchain can also be ensured, thereby ensuring security of the user privacy data generated by the user in the specified industry on the entire blockchain, and improving a security level of the user privacy data that is of the user and that is related to a personal experience in the specified industry.

Figure 3:
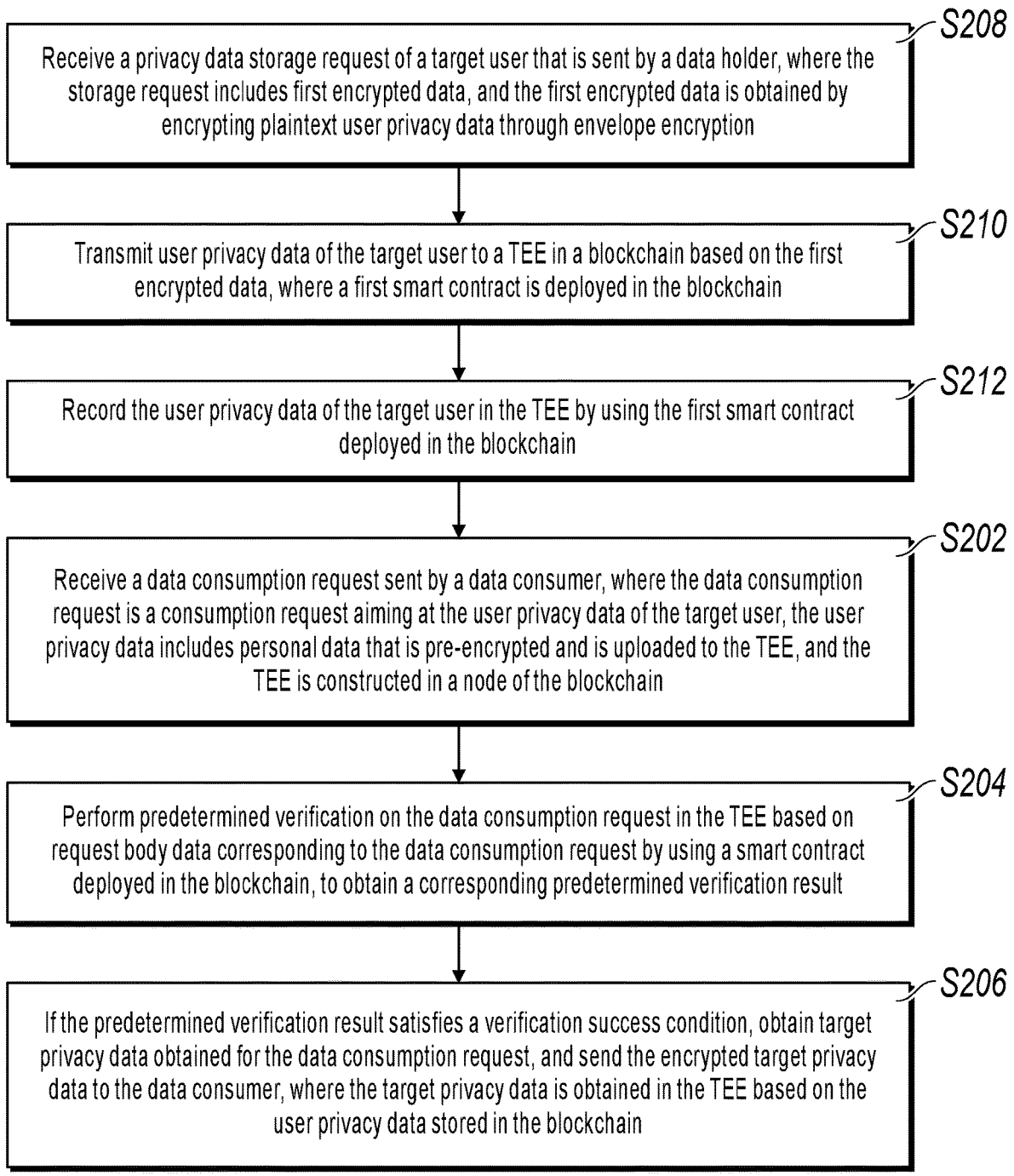
FIG. 3 is a second schematic flowchart illustrating a blockchain-based user privacy data providing method, according to one or more embodiments of the present specification.

The data providing node transmits the user privacy data to the TEE constructed in the node of the blockchain to associate all the recorded user privacy data of the target user and store the data in the TEE, thereby ensuring comprehensiveness, integrity, and security of the user privacy data of the target user. Specifically, in the data recording process of the user privacy data, as shown in FIG. 3, before S202 of receiving the data consumption request sent by the data consumer, the method further includes the following steps.

In S208, a privacy data storage request of the target user that is sent by the data holder is received, where the storage request includes first encrypted data, and the first encrypted data is obtained by encrypting plaintext user privacy data through envelope encryption.

The previous data holder can be an end-user device used by the target user, or a data authenticator for authenticating the user privacy data. For example, the data authenticator is a university that the user attends if the user privacy data is a university academic result.

In S210, the user privacy data of the target user is transmitted to the TEE in the blockchain based on the first encrypted data, where a first smart contract is deployed in the blockchain.

Specifically, the data providing node can directly transmit the first encrypted data included in the storage request to the TEE in the blockchain after receiving the privacy data storage request, or can decrypt and perform security verification on the first encrypted data, encrypt the user privacy data on which security verification succeeds, and transmit the data to the TEE in the blockchain, so that the at least one blockchain node in the blockchain to record the user privacy data of the target user in the TEE.

In S212, the user privacy data of the target user is recorded in the TEE by using the first smart contract deployed in the blockchain. Specifically, in the process of storing the user privacy data in the TEE in the blockchain, the user privacy data is associated with the recorded user privacy data of the target user, thereby ensuring comprehensiveness, integrity, and security of the user privacy data of the target user.

Specifically, if the blockchain is a consortium blockchain, a user or institution related to a specified industry is added to the consortium blockchain by establishing the consortium blockchain, so that all related information of the specified industry is integrated. For example, if the data consumer is a certain employer, and the employer needs to verify information on a resume of an applicant or query more personal information of the applicant, the employer can request a corresponding data consumption service from the data providing node, i.e., send a corresponding data consumption request to the data providing node. As such, the employer can quickly complete data verification and query on the applicant, so that intermediate manpower consumption caused by multi-party communication and cooperation in the society is reduced. For example, if the resume of the applicant includes personal information such as a school from which student X graduates, a training in an institution that student X participates in, and a company in which student X works, and if authenticity of the data needs to be verified, there is no need to respectively request data verification from the school, the training institution, and the historical entry company, but all the data can be verified by directly requesting a data verification service from the data providing node.

Figure 4:
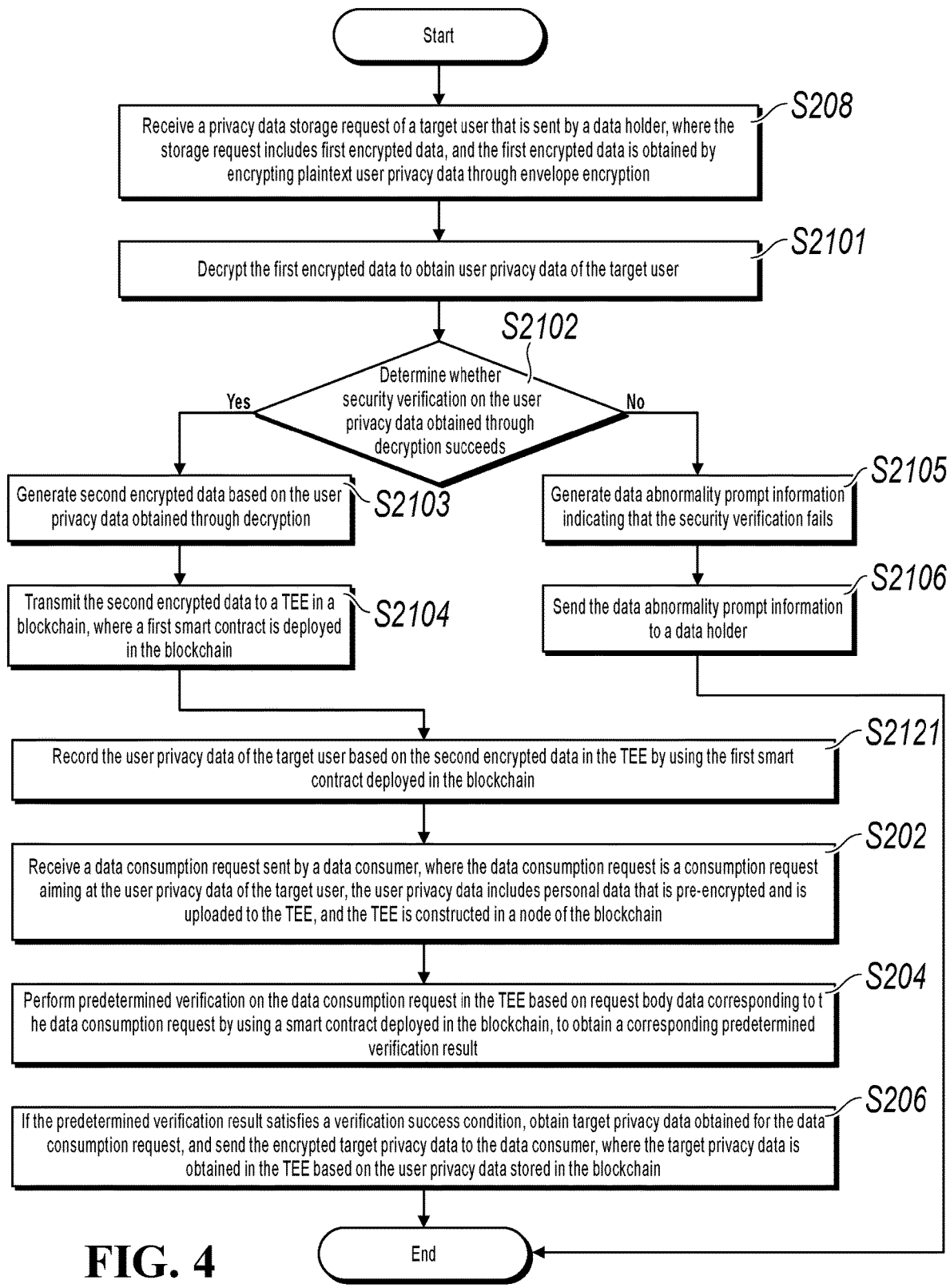
FIG. 4 is a third schematic flowchart illustrating a blockchain-based user privacy data providing method, according to one or more embodiments of the present specification.

Further, considering that the user privacy data that the data holder requests to record may have a certain risk, to further improve recording security of the privacy data, the user privacy data having a risk is directly filtered out at the data providing node and is prevented from flowing into the TEE. Based on this, as shown in FIG. 4, previous S210 of transmitting the user privacy data of the target user to the TEE in the blockchain based on the first encrypted data specifically includes the following steps:

In S2101, the first encrypted data is decrypted to obtain the user privacy data of the target user.

In S2102, whether security verification of the user privacy data obtained through decryption succeeds is determined, where the security verification process can be executed by a trusted data providing node, or can be executed by the trusted data providing node by triggering a third-party server.

If the security verification succeeds, S2103 of generating second encrypted data based on the user privacy data obtained through decryption and S2104 of transmitting the second encrypted data to the TEE in the blockchain are performed, where the first smart contract is deployed in the blockchain.

If the security verification fails, S2105 of generating data abnormality prompt information indicating that the security verification fails and S2106 of sending the data abnormality prompt information to the data holder are performed.

Correspondingly, S212 of recording the user privacy data of the target user in the TEE by using the first smart contract deployed in the blockchain specifically includes the following.

In S2121, the user privacy data of the target user is recorded in the TEE based on the second encrypted data by using the first smart contract deployed in the blockchain. Specifically, the blockchain node can obtain, by using a trusted application, the user privacy data (such as the second encrypted data) transmitted by the data providing node in a form of a ciphertext, and transmits the user privacy data to the local TEE.

The TEE can be a trusted execution environment. The TEE can be implemented (i.e., implemented in a form of software) by using a program written by using a predetermined programming language. The trusted execution environment of the TEE can be a secure data processing environment isolated from other environments. That is, processing performed in the TEE and data generated in the data processing process cannot be accessed by other execution environments or application programs other than the TEE. The TEE can be implemented by creating a small operating system capable of independently running in a trust zone, and the TEE can be a service that is directly provided through system invoking (such as through direct processing of a kernel of the trust zone). The TEE can use a provided interface to record the user privacy data, obtain the target privacy data, etc., to ensure that the user privacy data (such as user's education related data and user's payment related data) is not tampered with, a password is not hijacked, and information such as a fingerprint or a face is not stolen.

The trusted application can be a pre-specified trusted application that can be used to record the user privacy data or obtain the target privacy data, such as a certain financial payment application, a certain instant messaging application, or a pre-developed application. The trusted application can be an application that needs to be installed in an end-user device or server, or a code program that is pre-installed in a certain hardware device of an end-user device or a server, or a program that is set to run in the background of an operating system of an end-user device or a server in a form of a plugin. This can be set based on an actual situation.

Either in the recording stage of the user privacy data or the predetermined verification process in the consumption stage of the user privacy data, a used smart contract can be set in the TEE of the blockchain node in advance. The smart contract can include a verification constraint condition used to determine whether the predetermined verification result satisfies the verification success condition, or include a recording state determining condition used to determine whether the privacy data is recorded successfully. As such, to ensure security and tamper resistance of the verification constraint condition and the recording state determining condition, the smart contract can be a ciphertext, that is, the smart contract can be encrypted or signed by using a specified encryption or signature method, to form a ciphertext of the smart contract. The ciphertext of the smart contact is transmitted to the TEE of the blockchain node by using the trusted application and a specified secure data transmission channel. In the TEE, the ciphertext of the smart contract can be decrypted or verified. The smart contract can be stored to the TEE after it is determined that the verification constraint condition or the recording state determining condition in the smart contract is not tampered with.

During specific implementation, setting the trusted application used to record the user privacy data, obtain the target privacy data, or process the user privacy data can further ensure security of the user privacy data. The user privacy data is transmitted by using the trusted application to temporarily protect the user privacy data. For example, other unauthorized applications can be prevented from accessing the user privacy data to be recorded or the target privacy data to be returned to the data consumer, to protect the data. In addition, not only a trusted application is installed in the blockchain node, but also a corresponding trusted application can be installed and a TEE can be set in the data providing node. A secure interface can be configured for the trusted application in advance. Correspondingly, a corresponding secure interface can also be configured for the TEE of the blockchain node or the data providing node. A secure data transmission channel can be established between the trusted application and the TEE by using the secure interface between the trusted application and the TEE. The trusted application can transmit the user privacy data to the TEE of the blockchain node or the data providing node by using the previous secure interface and the data transmission channel. Configuring the trusted application, the secure interface, and the data transmission channel can ensure security of the user privacy data in the data recording or data consumption process.

It is worthwhile to note that there can be various trusted applications. A corresponding trusted application can be set based on the privacy level, etc. of the user privacy data, or can be set based on data content, data type, etc. of the user privacy data, or can be set based on different users corresponding to the user privacy data. In practice, how to set the trusted application can be set based on actual needs. This is not limited in the embodiments of the present specification.

To further provide security of the user privacy data, a TEE can also be set in the data providing node. Correspondingly, all data processing processes of the data providing node are executed in the TEE. Specifically, the data holder transmits the first encrypted data in the privacy data storage request to the data providing node by using the trusted application, and the data providing node generates the second encrypted data based on the first encrypted data in the local TEE, and transmits the second encrypted data to the TEE in the blockchain.

The first encrypted data can include first ciphertext privacy data obtained by encrypting the user privacy data by using a first symmetric key, and a first ciphertext key obtained by encrypting the first symmetric key by using a first public key.

Correspondingly, S2101 of decrypting the first encrypted data to obtain the user privacy data of the target user specifically includes the following.

In step 1, the first ciphertext key is decrypted by using a first private key corresponding to the first public key to obtain the first symmetric key.

In step 2, the first ciphertext privacy data is decrypted by using the first symmetric key obtained through decryption to obtain the user privacy data of the target user.

Specifically, the first symmetric key is a symmetric key automatically generated by the data holder by using a predetermined Software Development Kit (SDK). The first public key and the first private key are a pair of asymmetric keys generated for the data providing node. The first public key is sent to the data holder, and the first private key is stored in the data providing node locally. As such, the data holder uses the first public key to encrypt the data. Correspondingly, the data providing node uses the first private key to decrypt the encrypted data to obtain plaintext data. Because the first private key is only stored in the data providing node locally, only the data providing node can obtain the plaintext data by decrypting the data encrypted by the data holder by using the first public key.

After the first encrypted data is decrypted to obtain the plaintext user privacy data, security verification is performed on the user privacy data, user privacy data on which security verification succeeds is encrypted, and the encrypted user privacy data is uploaded to the blockchain. Based on this, S2103 of generating second encrypted data based on the user privacy data obtained through decryption specifically includes the following.

In step 1, the user privacy data of the target user is encrypted by using a second symmetric key to obtain second ciphertext privacy data.

In step 2, the second symmetric key is encrypted by using a second public key to obtain a second ciphertext key.

In step 3, the second encrypted data is generated based on the second ciphertext privacy data and the second ciphertext key.

Specifically, the second symmetric key is a symmetric key automatically generated by the data providing node by using the predetermined SDK. The second public key and the second private key are a pair of asymmetric keys generated for the blockchain. The second public key is sent to the data providing node, and the second private key is stored in the blockchain node locally. As such, the data providing node uses the second public key to encrypt the data. Correspondingly, the blockchain node uses the second private key to decrypt the encrypted data to obtain plaintext data. Because the second private key is only stored in the blockchain node locally, only the blockchain node can obtain the plaintext data by decrypting the data encrypted by the data providing node by using the second public key.

After the data providing node uploads the second encrypted data to the blockchain, the blockchain node needs to decrypt the second encrypted data, and then records the user privacy data obtained through decryption. Based on this, S2121 of recording the user privacy data of the target user in the TEE based on the second encrypted data by using the first smart contract deployed in the blockchain specifically includes the following.

In step 1, the second ciphertext key in the second encrypted data is decrypted in the TEE by using by using the second private key corresponding to the second public key and the first smart contract deployed in the blockchain, to obtain the second symmetric key.

In step 2, the second ciphertext privacy data in the second encrypted data is decrypted by using the second symmetric key obtained through decryption to obtain the user privacy data of the target user.

In step 3, the user privacy data of the target user is stored to the TEE in the blockchain.

Further, considering that data recording may fail, to avoid a problem that the user privacy data of the target user is missing or incomplete due to a data recording failure caused by network abnormality or blockchain node abnormality, a data recording state feedback mechanism is added. Specifically, after S212 of recording the user privacy data of the target user in the TEE by using the first smart contract deployed in the blockchain, the method further includes the following.

Data recording state information of the user privacy data that the data holder requests to record is obtained, where the data recording state information includes a data recording success or a data recording failure.

If the data recording state information is a data recording failure, S212 of recording the user privacy data of the target user in the TEE by using the first smart contract deployed in the blockchain continues to be triggered and performed, or recording abnormality prompt information is sent to a specified end-user device.

Specifically, the blockchain node returns the data recording state information of the user privacy data to the data providing node after recording the user privacy data. After obtaining the data recording state information, the data providing node re-triggers the blockchain node to record the user privacy data of the target user, thereby implementing a reliable recording service for the user privacy data.

Further, considering that there are a variety of reasons for the data recording failure, the data recording state information further includes data recording execution data. The data providing node determines a data recording failure reason based on the data recording execution data. If the data recording failure reason is network abnormality, S212 of recording the user privacy data of the target user in the TEE by using the first smart contract deployed in the blockchain continues to be triggered and performed. If the data recording failure reason is blockchain node abnormality, the recording abnormality prompt information that includes an identifier of an abnormal blockchain node is sent to a specified end-user device, to trigger maintenance for the abnormal blockchain node.

In addition, the data providing node can further update a recording request state record of the privacy data based on the data recording state information of the user privacy data for subsequent tracing.

In the consumption stage of the privacy data, the request body data can further include a third ciphertext key, and the third ciphertext key is obtained by encrypting a third symmetric key by using a third public key.

Correspondingly, S206 of sending the encrypted target privacy data to the data consumer specifically includes the following.

The third ciphertext key is decrypted by using a third private key corresponding to the third public key to obtain the third symmetric key.

The target privacy data is encrypted by using the third symmetric key obtained through decryption to obtain encrypted target privacy data.

The encrypted target privacy data is sent to the data consumer.

Specifically, the third symmetric key is a symmetric key automatically generated by the data consumer by using the predetermined SDK. The third public key and the third private key are a pair of asymmetric keys generated by the data providing node. The third public key and the third private key can be the same pair of asymmetric keys as the first public key and the first private key. The third public key is sent to the data consumer, and the third private key is stored in the data providing node locally. As such, the data consumer uses the third public key to encrypt the data. Correspondingly, the data providing node uses the third private key to decrypt the encrypted data to obtain plaintext data. Because the third private key is only stored in the data providing node locally, only the data providing node can obtain the plaintext data by decrypting the data encrypted by the data consumer by using the third public key.

In the process of performing predetermined verification on the data consumption request, S204 of performing predetermined verification on the data consumption request in the TEE based on request body data corresponding to the data consumption request by using a smart contract deployed in the blockchain, to obtain a corresponding predetermined verification result specifically includes the following:

In step 1, the request body data corresponding to the data consumption request is transmitted to the TEE in the blockchain, where a second smart contract is deployed in the blockchain.

In step 2, predetermined verification is performed on the data consumption request of a data request party in the TEE based on the request body data by using the second smart contract deployed in the blockchain, to obtain a corresponding predetermined verification result.

Specifically, step 1 of transmitting the request body data corresponding to the data consumption request to the TEE in the blockchain specifically includes the following.

The request body data corresponding to the data consumption request is encrypted by using a fourth symmetric key to obtain ciphertext request body data, where the request body data corresponding to the data consumption request can be the target request body data determined by the data providing node based on the original request body data and the unique on-chain account of each member in the consortium blockchain.

The fourth symmetric key is encrypted by using a fourth public key to obtain a fourth ciphertext key.

The ciphertext request body data and the fourth ciphertext key are transmitted to the TEE in the blockchain.

Specifically, the fourth symmetric key is a symmetric key automatically generated by the data providing node by using the predetermined SDK. The fourth public key and the fourth private key are a pair of asymmetric keys generated for the blockchain. The fourth public key and the fourth private key can be the same pair of asymmetric keys as the second public key and the second private key. The fourth public key is sent to the data providing node, and the fourth private key is stored in the blockchain node locally. As such, the data providing node uses the fourth public key to encrypt the data. Correspondingly, the blockchain node uses the fourth private key to decrypt the encrypted data to obtain plaintext data. Because the fourth private key is only stored in the blockchain node locally, only the blockchain node can obtain the plaintext data by decrypting the data encrypted by the data providing node by using the fourth public key.

Specifically, after the data providing node transmits the ciphertext request body data and the fourth ciphertext key as the request body data to the TEE in the blockchain, step 2 of performing predetermined verification on the data consumption request of a data request party in the TEE based on the request body data by using the second smart contract deployed in the blockchain, to obtain a corresponding predetermined verification result specifically includes the following.

The fourth ciphertext key is decrypted in the TEE by using the fourth private key corresponding to the fourth public key by using the second smart contract deployed in the blockchain to obtain the fourth symmetric key.

The ciphertext request body data is decrypted by using the fourth symmetric key obtained through decryption to obtain plaintext request body data.

Predetermined verification is performed on the data consumption request of the data consumer based on the plaintext request body data to obtain a corresponding predetermined verification result.

In addition, the blockchain node can use the fourth symmetric key to encrypt the target privacy data in the process of returning the target privacy data to the data providing node, and returns the encrypted target privacy data to the data providing node. The data providing node uses the locally generated fourth symmetric key to decrypt the encrypted target privacy data to obtain the plaintext target privacy data, and then uses the third symmetric key obtained through decryption to encrypt the plaintext target privacy data to obtain the encrypted target privacy data; and sends the encrypted target privacy data to the data consumer.

To further provide security of the user privacy data, a TEE can also be set in the data providing node. Correspondingly, all data processing processes of the data providing node are performed in the TEE. Specifically, the blockchain node transmits the encrypted target privacy data to the data providing node by using the trusted application, and the data providing node decrypts and encrypts the encrypted target privacy data in the local TEE to obtain the target privacy data encrypted by using the third symmetric key, and sends the encrypted target privacy data to the data consumer.

Specifically, in the process of performing predetermined verification on the data consumption request of the data consumer, the step of performing predetermined verification on the data consumption request of the data consumer based on the plaintext request body data to obtain the corresponding predetermined verification result specifically includes the following.

A data privacy attribute of the user privacy data corresponding to the data consumption request of the data consumer is verified to obtain a first verification result, where the first verification result includes the privacy level of the user privacy data. Specifically, the data privacy attribute of the user privacy data corresponding to the data consumption request of the data consumer is determined based on identifier information of data to be consumed in the plaintext request body data.

Whether a hosting relationship exists between a data hoster and the data holder of the user privacy data is verified based on a pre-stored data hosting record, to obtain a second verification result. The data hosting record includes a plurality of data hosting relationship records that can be uploaded by the data providing node to the blockchain in advance based on an authorization agreement signed by the data holder and the data hoster. The data hoster can be at least one member in the consortium blockchain, that is, the data holder signs a hosting agreement with at least one member in the consortium blockchain in advance. Specifically, whether a hosting relationship exists between the data hoster and the data holder of the user privacy data is determined based on the pre-stored data hosting record, the unique on-chain account of the data holder of the data to be consumed in the plaintext request body data, the unique on-chain account of the data hoster, and the identifier information of the data to be consumed.

Whether an authorization relationship exists between the data consumer and the data holder of the user privacy data is verified based on a pre-stored data authorization record to obtain a third verification result. The data authorization record includes a plurality of data authorization relationship records that can be uploaded by the data providing node to the blockchain in advance based on an authorization agreement signed by the data consumer and the data holder. Specifically, whether an authorization relationship exists between the data consumer and the data holder of the user privacy data is determined based on the pre-stored data authorization record, the unique on-chain account of the data holder of the data to be consumed in the plaintext request body data, the unique on-chain account of the data consumer, and the identifier information of the data to be consumed.

The predetermined verification result obtained for the data consumption request is determined based on at least one of the first verification result, the second verification result, the third verification result, and the type of the data consumption request.

During specific implementation, the data privacy level has the highest verification priority, that is, the privacy level of the user privacy data corresponding to the data consumption request is preferentially considered.

Specifically, the step of determining, based on at least one of the first verification result, the second verification result, the third verification result, and the type of the data consumption request, the predetermined verification result obtained for the data consumption request specifically includes the following.

Whether the data privacy level is lower than or equal to the first predetermined privacy level is determined based on the first verification result.

If the data privacy level is lower than or equal to the first predetermined privacy level, the predetermined verification result obtained for the data consumption request is determined based on the first verification result and the third verification result.

If the data privacy level is higher than the first predetermined privacy level, whether the data privacy level is higher than or equal to the second predetermined privacy level is determined.

If the data privacy level is higher than or equal to the second predetermined privacy level, the predetermined verification result obtained for the data consumption request is determined based on the first verification result, the second verification result, the third verification result, and the type of the data consumption request.

If the data privacy level is higher than the first predetermined privacy level and lower than the second predetermined privacy level, the predetermined verification result obtained for the data consumption request is determined based on the first verification result, the second verification result, and the third verification result.

Whether the predetermined verification result satisfies any predetermined verification constraint condition is determined after the predetermined verification result is determined. If yes, it is determined that the predetermined verification result satisfies the verification success condition, that is, the data consumer is allowed to obtain the desired target privacy data.

The verification constraint condition can include at least one of the following:

(1) The data privacy level is higher than the first predetermined privacy level and lower than the second predetermined privacy level, and the authorization relationship and the hosting relationship exist.

(2) The data privacy level is higher than or equal to the second predetermined privacy level, the target request type is a data verification request, and the authorization relationship and the hosting relationship exist.

(3) The data privacy level is lower than or equal to the first predetermined privacy level, and the hosting relationship exists.

For example, the first predetermined privacy level is level 0, and the second predetermined privacy level is level 2. If the data privacy level of the user privacy data is level 1, an authorization relationship exists between the data consumer and the data holder, and a hosting relationship exists between the data holder and any data hoster, it is determined that the predetermined verification result satisfies the verification success condition.

If the data privacy level of the user privacy data is level 2, the data consumption request is a data verification request, an authorization relationship exists between the data consumer and the data holder, and a hosting relationship exists between the data holder and any data hoster, it is determined that the predetermined verification result satisfies the verification success condition.

If the data privacy level of the user privacy data is level 0 and a hosting relationship exists between the data holder and any data hoster, it is determined that the predetermined verification result satisfies the verification success condition.

If the data privacy level is higher than or equal to the second predetermined privacy level and the data consumption request is a query request, it is determined that the predetermined verification result does not satisfy the verification success condition. The data providing node sends, to the data consumer, feedback information indicating no response is made to the data consumption request, so that the data consumer provides user privacy data to be verified.

In other words, if the privacy level of the user privacy data corresponding to the data consumption request is higher than the first predetermined privacy level and lower than the second predetermined privacy level, the data consumer is allowed to query the authorized user privacy data, i.e., the data consumer can obtain the plaintext user privacy data. If the privacy level of the user privacy data corresponding to the data consumption request is higher than or equal to the second predetermined privacy level, a verification service for known user privacy data is provided to the data consumer. Specifically, the data consumer needs to provide one piece of user privacy data, performs comparative verification on the user privacy data included in the data consumption request and real privacy data uploaded to the blockchain in advance, and returns a verification result for the user privacy data included in the data consumption request to the data consumer, i.e., the data consumer cannot obtain the plaintext user privacy data at a relatively high privacy data level from the blockchain. The user privacy data is open data if the privacy level of the user privacy data corresponding to the data consumption request is lower than or equal to the first predetermined privacy level, and a query service for the user privacy data can be externally provided without authorization.

Figure 5:
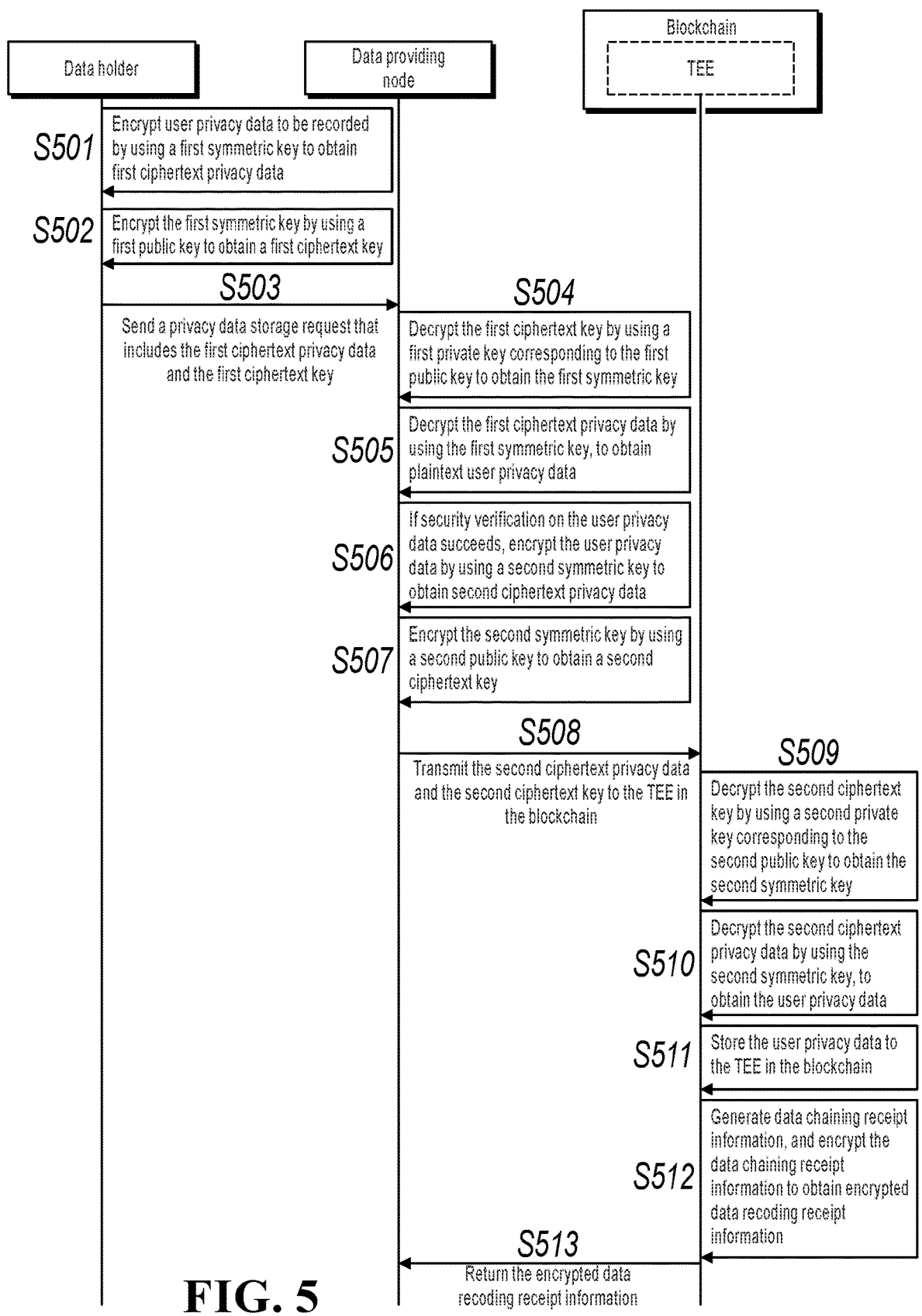
FIG. 5 is a first schematic diagram illustrating a multi-device interaction process in a blockchain-based user privacy data providing method, according to one or more embodiments of the present specification.

In some specific embodiments, recording the user privacy data sent by the data holder through data exchange between an external trusted node and the blockchain node is used an example. As shown in FIG. 5, the process of recording the user privacy data specifically includes the following.

In S501, the data holder encrypts the user privacy data to be recorded by using the first symmetric key to obtain the first ciphertext privacy data.

In S502, the data holder encrypts the first symmetric key by using the first public key to obtain the first ciphertext key.

In S503, the data holder sends, to the data providing node, the privacy data storage request that includes the first ciphertext privacy data and the first ciphertext key.

In S504, the data providing node decrypts the first ciphertext key by using the first private key corresponding to the first public key to obtain the first symmetric key.

In S505, the data providing node decrypts the first ciphertext privacy data by using the first symmetric key obtained through decryption, to obtain the plaintext user privacy data of the target user.

In S506, if the security verification on the plaintext user privacy data succeeds, the data providing node encrypts the user privacy data of the target user by using the second symmetric key to obtain the second ciphertext privacy data.

In S507, the data providing node encrypts the second symmetric key by using the second public key to obtain the second ciphertext key.

In S508, the data providing node transmits the second ciphertext privacy data and the second ciphertext key to the TEE in the blockchain to invoke the smart contract deployed in the blockchain for data recording.

In S509, the blockchain node decrypts the second ciphertext key in the TEE by using the second private key corresponding to the second public key to obtain the second symmetric key.

In S510, the blockchain node decrypts the second ciphertext privacy data by using the second symmetric key obtained through decryption, to obtain the user privacy data of the target user.

In S511, the blockchain node stores the user privacy data of the target user to the TEE in the blockchain.

In S512, the blockchain node generates data recording receipt information for the user privacy data by using the first smart contract deployed in the blockchain, and encrypts the data recording receipt information by using the second symmetric key to obtain encrypted data recording receipt information.

In S513, the blockchain node returns the encrypted data recording receipt information to the data providing node, so that the data providing node updates a recording execution state of the user privacy data based on the data recording receipt information obtained through decryption by using the second symmetric key, where the recording execution state includes a recording succeed state or a recording fail state.

Figure 6:
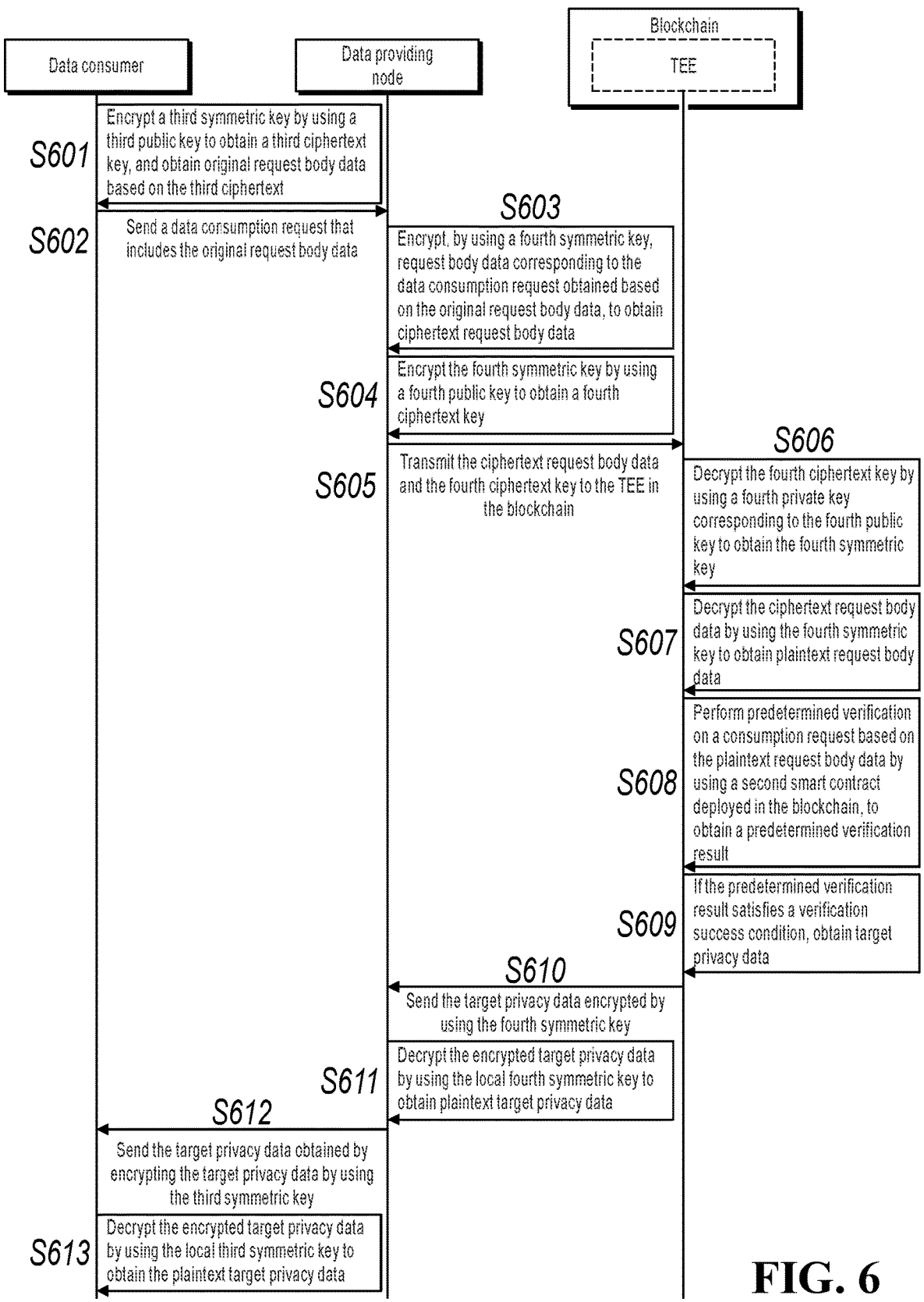
FIG. 6 is a second schematic diagram illustrating a multi-device interaction process in a blockchain-based user privacy data providing method, according to one or more embodiments of the present specification.

Correspondingly, providing the query service of the user privacy data to the data consumer through data exchange between the external trusted node and the blockchain node is used an example. As shown in FIG. 6, the data consumption process of the user privacy data specifically includes the following.

In S601, the data consumer encrypts the third symmetric key by using the third public key to obtain the third ciphertext key, and obtains the original request body data based on the third ciphertext key.

In S602, the data consumer sends, to the data providing node, the data consumption request that includes the original request body data.

In S603, the data providing node encrypts, by using the fourth symmetric key, the request body data corresponding to the data consumption request obtained based on the original request body data, to obtain the ciphertext request body data.

In S604, the data providing node encrypts the fourth symmetric key by using the fourth public key to obtain the fourth ciphertext key.

In S605, the data providing node transmits the ciphertext request body data and the fourth ciphertext key to the TEE in the blockchain to invoke the smart contract deployed in the blockchain to obtain the corresponding target privacy data.

In S606, the blockchain node decrypts the fourth ciphertext key in the TEE by using the fourth private key corresponding to the fourth public key to obtain the fourth symmetric key.

In S607, the blockchain node decrypts the ciphertext request body data by using the fourth symmetric key obtained through decryption, to obtain the plaintext request body data.

In S608, the blockchain node performs predetermined verification on the data consumption request of the data consumer based on the plaintext request body data by using the second smart contract deployed in the blockchain, to obtain the corresponding predetermined verification result, where the predetermined verification includes at least one of data privacy attribute verification, data hosting relationship verification, and data authorization relationship verification.

In S609, if the predetermined verification result satisfies the verification success condition, the blockchain node obtains the target privacy data corresponding to the data consumption request.

In S610, the blockchain node sends the target privacy data encrypted by using the fourth symmetric key to the data providing node.

In S611, the data providing node decrypts the encrypted target privacy data by using the local fourth symmetric key to obtain the plaintext target privacy data.

In S612, the data providing node sends, to the data consumer, the target privacy data obtained by encrypting the plaintext target privacy data by using the third symmetric key, where the third symmetric key is obtained by decrypting the third ciphertext key using the third private key corresponding to the third public key.

In S613, the data consumer decrypts the encrypted target privacy data by using the local third symmetric key to obtain the plaintext target privacy data.

In the blockchain-based user privacy data providing method in one or more embodiments of the present specification, the data consumption request sent by the data consumer is received, where the data consumption request is a consumption request aiming at the user privacy data of the target user, the user privacy data includes personal data that is pre-encrypted and is uploaded to the TEE, and the TEE is constructed in the node of the blockchain. Predetermined verification is performed on the data consumption request in the TEE based on the request body data corresponding to the data consumption request by using the smart contract deployed in the blockchain, to obtain the corresponding predetermined verification result. If the predetermined verification result satisfies the verification success condition, the target privacy data obtained for the data consumption request is obtained, and the encrypted target privacy data is sent to the data consumer, where the target privacy data is obtained based on the user privacy data stored in the blockchain in the TEE. Either in the data recording stage of the user privacy data or the data consumption stage of the user privacy data, corresponding data processing is performed by using the TEE constructed in the node of the blockchain, and data is transmitted in a form of a ciphertext during the data transmission process, to upload the user privacy data to the TEE of the blockchain, and return the target privacy data to the data consumer, thereby externally providing the consumption service of the user privacy data. As such, security of the user privacy data in the data transmission process can be ensured, and security of the user privacy data on which data processing is performed on the blockchain can also be ensured, thereby ensuring security of the user privacy data generated by the user in the specified industry on the entire blockchain, and improving a security level of the user privacy data that is of the user and that is related to personal experience in the specified industry.

Figure 7:
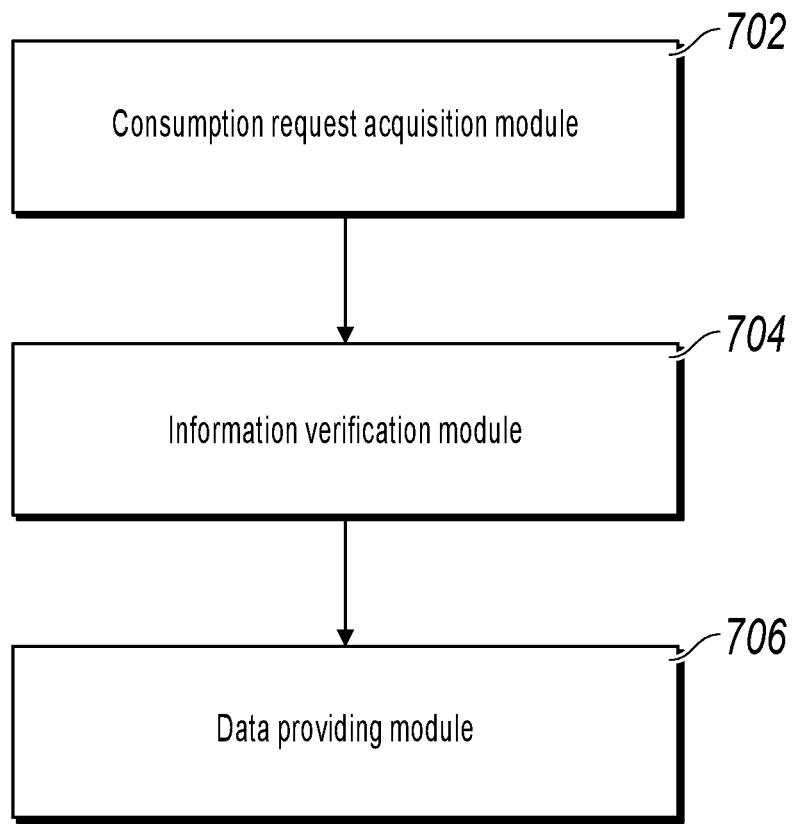
FIG. 7 is a schematic diagram illustrating first module composition of a blockchain-based user privacy data providing apparatus, according to one or more embodiments of the present specification.

Corresponding to the blockchain-based user privacy data providing methods described in FIG. 2 to FIG. 6, based on the same technical idea, one or more embodiments of the present specification further provide a blockchain-based user privacy data providing apparatus. FIG. 7 is a schematic diagram illustrating first module composition of a blockchain-based user privacy data providing apparatus, according to one or more embodiments of the present specification. The apparatus is configured to perform the blockchain-based user privacy data providing methods described in FIG. 2 to FIG. 6. As shown in FIG. 7, the apparatus includes: a consumption request acquisition module 702, configured to receive a data consumption request sent by a data consumer, where the data consumption request is a consumption request aiming at user privacy data of a target user, the user privacy data includes personal data that is pre-encrypted and is uploaded to a TEE, and the TEE is constructed in a node of a blockchain; an information verification module 704, configured to perform predetermined verification on the data consumption request in the TEE based on request body data corresponding to the data consumption request by using a smart contract deployed in the blockchain, to obtain a corresponding predetermined verification result; and a data providing module 706, configured to: if the predetermined verification result satisfies a verification success condition, obtain target privacy data obtained for the data consumption request, and send the encrypted target privacy data to the data consumer, where the target privacy data is obtained in the TEE based on the user privacy data stored in the blockchain.

Figure 8:
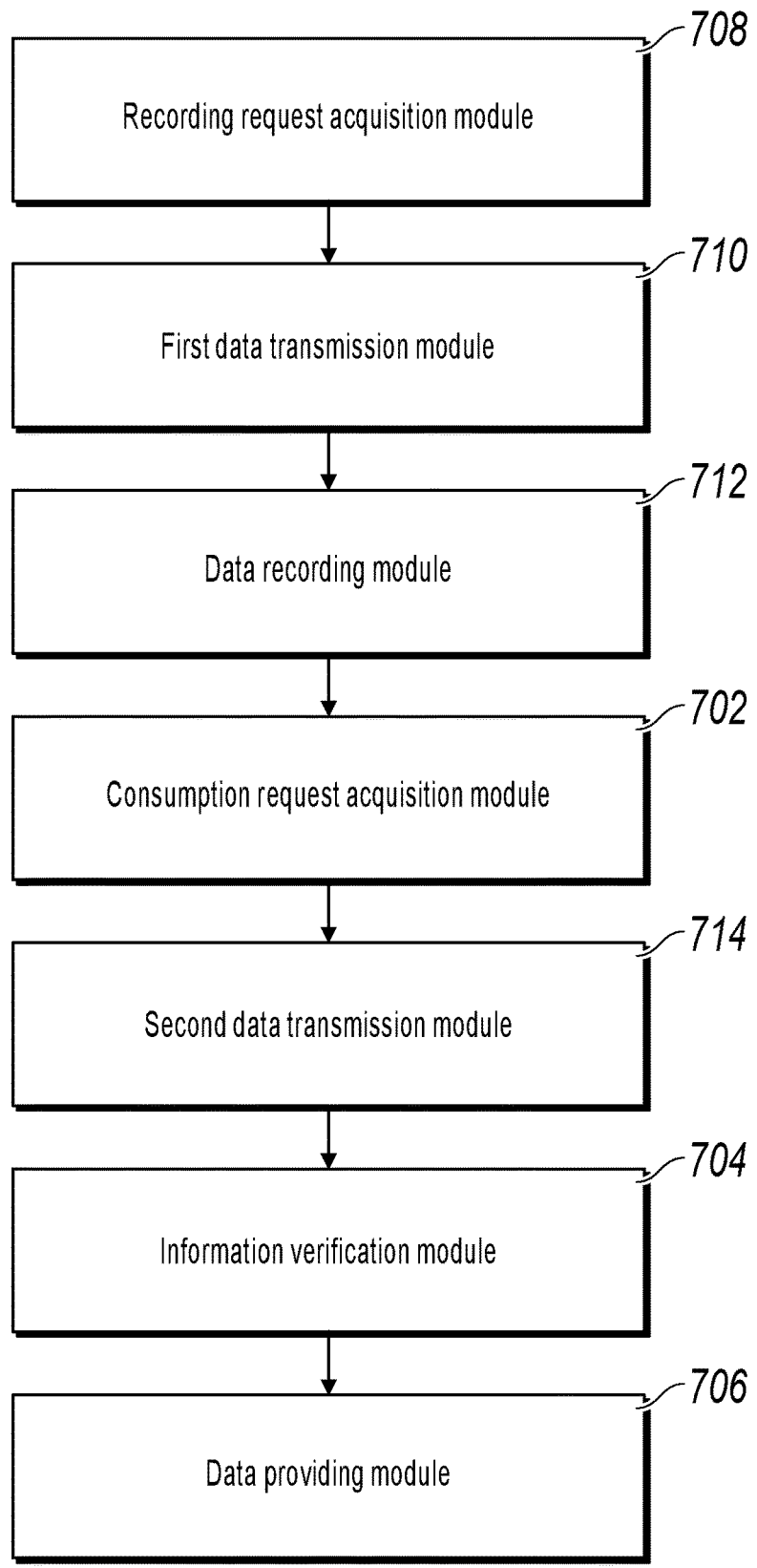
FIG. 8 is a schematic diagram illustrating second module composition of a blockchain-based user privacy data providing apparatus, according to one or more embodiments of the present specification.

Optionally, as shown in FIG. 8, the apparatus further includes: a recording request acquisition module 708, configured to receive a privacy data storage request of the target user that is sent by a data holder, where the storage request includes first encrypted data, and the first encrypted data is obtained by encrypting plaintext user privacy data through envelope encryption; a first data transmission module 710, configured to transmit the user privacy data to the TEE in the blockchain based on the first encrypted data, where a first smart contract is deployed in the blockchain; and a data recording module 712, configured to record the user privacy data in the TEE by using the first smart contract.

Optionally, the first data transmission module 710 is configured to: decrypt the first encrypted data to obtain the user privacy data of the target user; determine whether security verification of the user privacy data obtained through decryption succeeds; if the security verification succeeds, generate second encrypted data based on the user privacy data; and transmit the second encrypted data to the TEE in the blockchain.

Optionally, the first encrypted data includes first ciphertext privacy data obtained by encrypting the user privacy data by using a first symmetric key, and a first ciphertext key obtained by encrypting the first symmetric key by using a first public key.

Correspondingly, the first data transmission module 710 is configured to: decrypt the first ciphertext key by using a first private key corresponding to the first public key to obtain the first symmetric key; and decrypt the first ciphertext privacy data by using the first symmetric key to obtain the user privacy data.

Optionally, the first data transmission module 710 is configured to: encrypt the user privacy data of the target user by using a second symmetric key to obtain second ciphertext privacy data; encrypt the second symmetric key by using a second public key to obtain second ciphertext key; and generate second encrypted data based on the second ciphertext privacy data and the second ciphertext key.

Optionally, the data recording module 712 is configured to: decrypt the second ciphertext key in the TEE by using a second private key corresponding to the second public key and the first smart contract, to obtain the second symmetric key; decrypt the second ciphertext privacy data by using the second symmetric key to obtain the user privacy data; and store the user privacy data to the TEE in the blockchain.

Optionally, the apparatus further includes: an abnormality feedback module, configured to: if the security verification on the user privacy data fails, generate data abnormality prompt information indicating that the security verification fails, and send the data abnormality prompt information to the data holder.

Optionally, the apparatus further includes: a recording state acquisition module, configured to obtain data recording state information of the user privacy data; and a recording abnormality response module, configured to: if the data recording state information indicates that data recording fails, continue to trigger and perform the step of recording the user privacy data in the TEE by using the first smart contract, or send recording abnormality prompt information to a specified end-user device.

Optionally, the request body data includes a third ciphertext key, and the third ciphertext key is obtained by encrypting a third symmetric key by using a third public key.

The data providing module 706 is configured to: decrypt the third ciphertext key by using a third private key corresponding to the third public key to obtain the third symmetric key; encrypt the target privacy data by using the third symmetric to obtain the encrypted target privacy data; and send the encrypted target privacy data to the data consumer.

Optionally, the apparatus further includes: a second data transmission module 714, configured to transmit the request body data corresponding to the data consumption request to the TEE in the blockchain, where a second smart contract is deployed in the blockchain.

Correspondingly, the information verification module 704 is configured to perform predetermined verification on the data consumption request in the TEE based on the request body data by using the second smart contract, to obtain a corresponding predetermined verification result.

Correspondingly, the second data transmission module 714 is configured to: encrypt the request body data corresponding to the data consumption request by using a fourth symmetric key to obtain ciphertext request body data; encrypt the fourth symmetric key by using a fourth public key to obtain a fourth ciphertext key; and transmit the ciphertext request body data and the fourth ciphertext key to the TEE in the blockchain.

Optionally, the information verification module 704 is configured to: decrypt the fourth ciphertext key in the TEE by using a fourth private key corresponding to the fourth public key and the second smart contract to obtain the fourth symmetric key; decrypt the ciphertext request body data by using the fourth symmetric key to obtain plaintext request body data; and perform predetermined verification on the data consumption request based on the plaintext request body data to obtain a corresponding predetermined verification result.

Optionally, the information verification module 704 is configured to: verify a data privacy attribute of the user privacy data corresponding to the data consumption request, to obtain a first verification result; verify, based on a pre-stored data hosting record, whether a hosting relationship exists between a data hoster and a data holder of the user privacy data, to obtain a second verification result; verify, based on a pre-stored data authorization record, whether an authorization relationship exists between the data consumer and the data holder, to obtain a third verification result; and determine, based on at least one of the first verification result, the second verification result, and the third verification result, the predetermined verification result obtained for the data consumption request.

Optionally, the user privacy data includes user behavior data used to indicate an education experience of the target user.

The blockchain-based user privacy data providing apparatus in one or more embodiments of the present specification receives the data consumption request sent by the data consumer, where the data consumption request is a consumption request aiming at the user privacy data of the target user, the user privacy data includes personal data that is pre-encrypted and is uploaded to the TEE, and the TEE is constructed in the node of the blockchain; performs predetermined verification on the data consumption request in the TEE based on the request body data corresponding to the data consumption request by using the smart contract deployed in the blockchain, to obtain the corresponding predetermined verification result; and if the predetermined verification result satisfies the verification success condition, obtains the target privacy data obtained for the data consumption request, and sends the encrypted target privacy data to the data consumer, where the target privacy data is obtained based on the user privacy data stored in the blockchain in the TEE. Either in the data recording stage of the user privacy data or the data consumption stage of the user privacy data, corresponding data processing is performed by using the TEE constructed in the node of the blockchain, and data is transmitted in a form of a ciphertext, to upload the user privacy data to the TEE of the blockchain, and return the target privacy data to the data consumer, thereby externally providing the consumption service of the user privacy data. As such, security of the user privacy data in the data transmission process can be ensured, and security of the user privacy data on which data processing is performed on the blockchain can also be ensured, thereby ensuring security of the user privacy data generated by the user in the specified industry on the entire record, and improving a security level of the user privacy data that is of the user and that is related to personal experience in the specified industry.

It is worthwhile to note that in the present specification, the embodiments of the blockchain-based user privacy data providing apparatus and the embodiments of the blockchain-based user privacy data providing method are based on the same inventive idea, for specific implementation of the embodiments, references can be made to implementation of the previous corresponding blockchain-based user privacy data providing method. Repetitions are omitted for simplicity.

Figure 9:
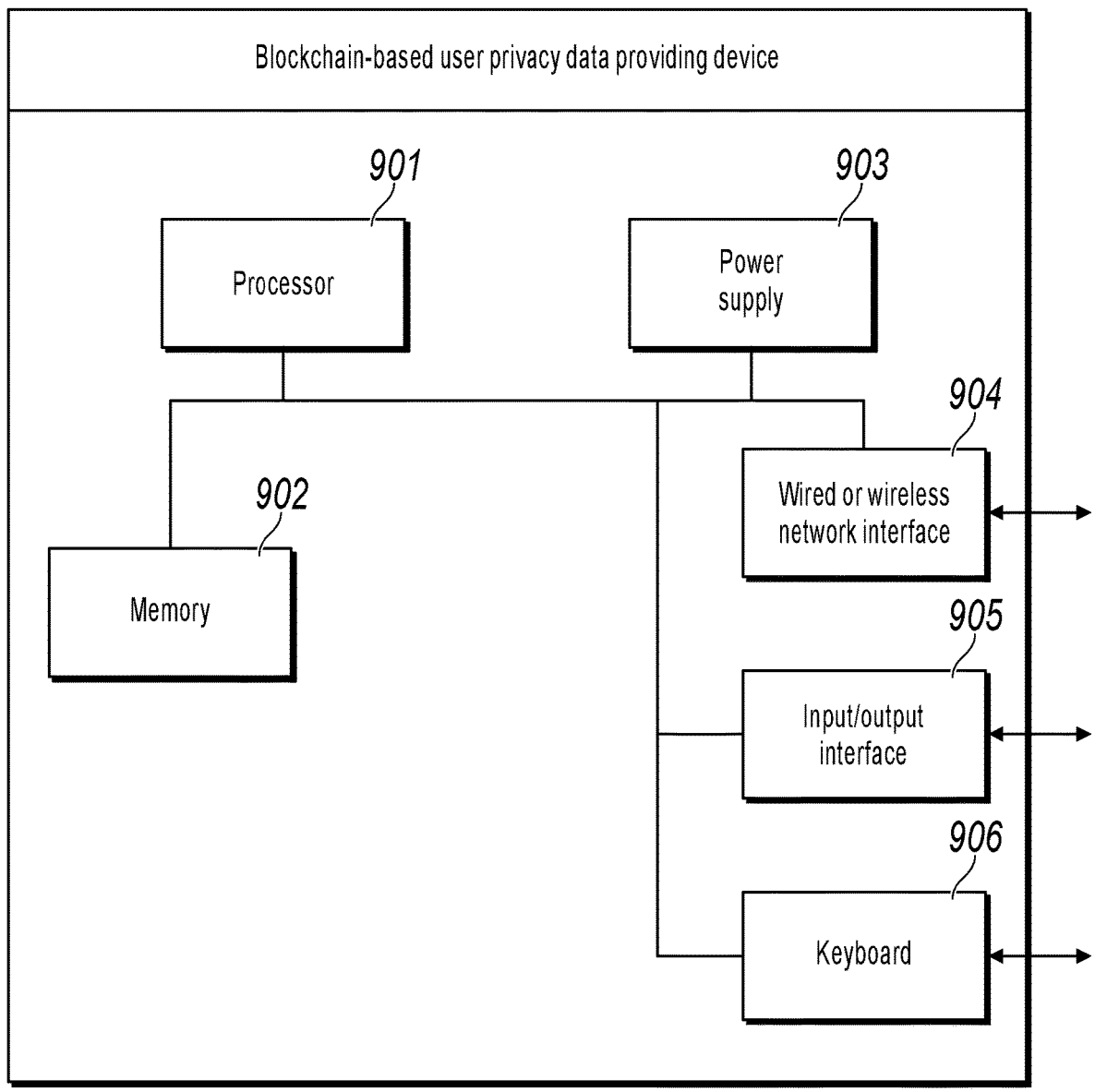
FIG. 9 is a schematic structural diagram illustrating a blockchain-based user privacy data providing device, according to one or more embodiments of the present specification.

Further, corresponding to the methods shown in FIG. 2 to FIG. 6, based on the same technical idea, one or more embodiments of the present specification further provide a blockchain-based user privacy data providing device. As shown in FIG. 9, the device is configured to perform the blockchain-based user privacy data providing methods.

The blockchain-based user privacy data providing device can vary greatly based on configuration or performance, and can include one or more processors 901 and memories 902. The memory 902 can store one or more storage application programs or data. The memory 902 can be a volatile memory or a non-volatile memory. The application programs stored in the memory 902 can include one or more modules (not shown in the figure), and each module can include a series of computer executable instructions in the blockchain-based user privacy data providing device. Further, the processor 901 can be configured to communicate with the memory 902 and execute the series of computer executable instructions in the memory 902 on the blockchain-based user privacy data providing device. The blockchain-based user privacy data providing device can further include one or more power supplies 903, one or more wired or wireless network interfaces 904, one or more input/output interfaces 905, one or more keyboards 906, etc.

In one or more specific embodiments, the blockchain-based user privacy data providing device includes a memory and one or more programs. The one or more programs are stored in the memory. The one or more programs can include one or more modules. Each module can include a series of computer executable instructions in the blockchain-based user privacy data providing device. One or more processors are configured to execute the following computer executable instructions included in the one or more programs: receiving a data consumption request sent by a data consumer, where the data consumption request is a consumption request aiming at user privacy data of a target user, the user privacy data includes personal data that is pre-encrypted and is uploaded to a TEE, and the TEE is constructed in a node of a blockchain; performing predetermined verification on the data consumption request in the TEE based on request body data corresponding to the data consumption request by using a smart contract deployed in the blockchain, to obtain a corresponding predetermined verification result; and if the predetermined verification result satisfies a verification success condition, obtaining target privacy data obtained for the data consumption request, and sending the encrypted target privacy data to the data consumer, where the target privacy data is obtained in the TEE based on the user privacy data stored in the blockchain.

Optionally, when the computer executable instructions are being executed, before the receiving a data consumption request sent by a data consumer, the following is further included: receiving a privacy data storage request of the target user that is sent by a data holder, where the storage request includes first encrypted data, and the first encrypted data is obtained by encrypting plaintext user privacy data through envelope encryption; transmitting the user privacy data to the TEE in the blockchain based on the first encrypted data, where a first smart contract is deployed in the blockchain; and recording the user privacy data in the TEE by using the first smart contract.

Optionally, when the computer executable instructions are being executed, the transmitting the user privacy data to the TEE in the blockchain based on the first encrypted data includes: decrypting the first encrypted data to obtain the user privacy data of the target user; determining whether security verification of the user privacy data obtained through decryption succeeds; if the security verification succeeds, generating second encrypted data based on the user privacy data; and transmitting the second encrypted data to the TEE in the blockchain.

Optionally, when the computer executable instructions are being executed, the first encrypted data includes first ciphertext privacy data obtained by encrypting the user privacy data by using a first symmetric key, and a first ciphertext key obtained by encrypting the first symmetric key by using a first public key.

The decrypting the first encrypted data to obtain the user privacy data of the target user includes: decrypting the first ciphertext key by using a first private key corresponding to the first public key to obtain the first symmetric key; and decrypting the first ciphertext privacy data by using the first symmetric key to obtain the user privacy data.

Optionally, when the computer executable instructions are being executed, the generating second encrypted data based on the user privacy data includes: decrypting the first ciphertext privacy data by using the first symmetric key to obtain the user privacy data; encrypting the second symmetric key by using a second public key to obtain a second ciphertext key; and generating the second encrypted data based on the second ciphertext privacy data and the second ciphertext key.

Optionally, when the computer executable instructions are being executed, the recording the user privacy data in the TEE by using the first smart contract includes: decrypting the second ciphertext key in the TEE by using a second private key corresponding to the second public key and the first smart contract, to obtain the second symmetric key; decrypting the second ciphertext privacy data by using the second symmetric key to obtain the user privacy data; and storing the user privacy data to the TEE in the blockchain.

Optionally, when the computer executable instructions are being executed, after the decrypting the first encrypted data to obtain the user privacy data of the target user, the following is further included: if the security verification on the user privacy data fails, generating data abnormality prompt information indicating that the security verification fails, and sending the data abnormality prompt information to the data holder.

Optionally, when the computer executable instructions are being executed, after the recording the user privacy data in the TEE by using the first smart contract, the following is further included: obtaining data recording state information of the user privacy data; and if the data recording state information indicates that data recording fails, continuing to trigger and perform the step of recording the user privacy data in the TEE by using the first smart contract, or sending recording abnormality prompt information to a specified end-user device.

Optionally, when the computer executable instructions are being executed, the request body data includes a third ciphertext key, and the third ciphertext key is obtained by encrypting a third symmetric key by using a third public key.

The sending the encrypted target privacy data to the data consumer includes: decrypting the third ciphertext key by using a third private key corresponding to the third public key to obtain the third symmetric key; encrypting the target privacy data by using the third symmetric key to obtain the encrypted target privacy data; and sending the encrypted target privacy data to the data consumer.

Optionally, when the computer executable instructions are being executed, the performing predetermined verification on the data consumption request in the TEE based on request body data corresponding to the data consumption request by using a smart contract deployed in the blockchain, to obtain a corresponding predetermined verification result includes: transmitting the request body data corresponding to the data consumption request to the TEE in the blockchain, where a second smart contract is deployed in the blockchain; and performing predetermined verification on the data consumption request in the TEE based on the request body data by using the second smart contract, to obtain a corresponding predetermined verification result.

Optionally, when the computer executable instructions are being executed, the transmitting the request body data corresponding to the data consumption request to the TEE in the blockchain includes: encrypting the request body data corresponding to the data consumption request by using a fourth symmetric key to obtain ciphertext request body data; encrypting the fourth symmetric key by using a fourth public key to obtain a fourth ciphertext key; and transmitting the ciphertext request body data and the fourth ciphertext key to the TEE in the blockchain.

Optionally, when the computer executable instructions are being executed, the performing predetermined verification on the data consumption request in the TEE based on the request body data by using the second smart contract, to obtain a corresponding predetermined verification result includes: decrypting the fourth ciphertext key in the TEE by using a fourth private key corresponding to the fourth public key and the second smart contract to obtain the fourth symmetric key; decrypting the ciphertext request body data by using the fourth symmetric key to obtain plaintext request body data; and performing predetermined verification on the data consumption request based on the plaintext request body data to obtain a corresponding predetermined verification result.

Optionally, when the computer executable instructions are being executed, the performing predetermined verification on the data consumption request based on the plaintext request body data to obtain a corresponding predetermined verification result includes: verifying a data privacy attribute of the user privacy data corresponding to the data consumption request, to obtain a first verification result; verifying, based on a pre-stored data hosting record, whether a hosting relationship exists between a data hoster and a data holder of the user privacy data, to obtain a second verification result; verifying, based on a pre-stored data authorization record, whether an authorization relationship exists between the data consumer and the data holder, to obtain a third verification result; and determining, based on at least one of the first verification result, the second verification result, and the third verification result, the predetermined verification result obtained for the data consumption request.

Optionally, when the computer executable instructions are being executed, the user privacy data includes user behavior data used to indicating an education experience of the target user.

The blockchain-based user privacy data providing device in one or more embodiments of the present specification receives the data consumption request sent by the data consumer, where the data consumption request is a consumption request aiming at the user privacy data of the target user, the user privacy data includes personal data that is pre-encrypted and is uploaded to a TEE, and the TEE is constructed in the node of the blockchain; performs predetermined verification on the data consumption request in the TEE based on the request body data corresponding to the data consumption request by using the smart contract deployed in the blockchain, to obtain the corresponding predetermined verification result; and if the predetermined verification result satisfies the verification success condition, obtains the target privacy data obtained for the data consumption request, and sends the encrypted target privacy data to the data consumer, where the target privacy data is obtained in the TEE based on the user privacy data stored in the blockchain. Either in the data recording stage of the user privacy data or the data consumption stage of the user privacy data, corresponding data processing is performed by using the TEE constructed in the node of the blockchain, and data is transmitted in a form of a ciphertext, to upload the user privacy data to the TEE of the blockchain, and return the target privacy data to the data consumer, thereby externally providing the consumption service of the user privacy data. As such, security of the user privacy data in the data transmission process can be ensured, and security of the user privacy data on which data processing is performed on the blockchain can also be ensured, thereby ensuring security of the user privacy data generated by the user in the specified industry on the entire record, and improving a security level of the user privacy data that is of the user and that is related to personal experience in the specified industry.

It is worthwhile to note that in the present specification, the embodiments of the blockchain-based user privacy data providing device and the embodiments of the blockchain-based user privacy data providing method are based on the same inventive idea, for specific implementation of the embodiments, references can be made to implementation of the previous corresponding blockchain-based user privacy data providing method. Repetitions are omitted for simplicity.

Further, corresponding to the methods shown in FIG. 2 to FIG. 6, based on the same technical idea, one or more embodiments of the present specification further provide a storage medium configured to store computer executable instructions. In some specific embodiments, the storage medium can be a USB flash disk, an optical disk, a hard disk, etc. When the computer executable instructions stored in the storage medium are being executed by a processor, the following process can be implemented: receiving a data consumption request sent by a data consumer, where the data consumption request is a consumption request aiming at user privacy data of a target user, the user privacy data includes personal data that is pre-encrypted and is uploaded to a TEE, and the TEE is constructed in a node of a blockchain; performing predetermined verification on the data consumption request in the TEE based on request body data corresponding to the data consumption request by using a smart contract deployed in the blockchain, to obtain a corresponding predetermined verification result; and if the predetermined verification result satisfies a verification success condition, obtaining target privacy data obtained for the data consumption request, and sending the encrypted target privacy data to the data consumer, where the target privacy data is obtained in the TEE based on the user privacy data stored in the blockchain.

Optionally, when the computer executable instructions stored in the storage medium are being executed by the processor, before the receiving a data consumption request sent by a data consumer, the following is further included: receiving a privacy data storage request of the target user that is sent by a data holder, where the privacy data storage request includes first encrypted data, and the first encrypted data is obtained by encrypting plaintext user privacy data through envelope encryption; and transmitting the user privacy data to the TEE in the blockchain based on the first encrypted data, where a first smart contract is deployed in the blockchain, and recording the user privacy data in the TEE by using the first smart contract.

Optionally, when the computer executable instructions stored in the storage medium are being executed by the processor, the transmitting the user privacy data to the TEE in the blockchain based on the first encrypted data includes: decrypting the first encrypted data to obtain the user privacy data of the target user; determining whether security verification of the user privacy data obtained through decryption succeeds; if the security verification succeeds, generating second encrypted data based on the user privacy data; and transmitting the second encrypted data to the TEE in the blockchain.

Optionally, when the computer executable instructions stored in the storage medium are being executed by the processor, the first encrypted data includes first ciphertext privacy data obtained by encrypting the user privacy data by using a first symmetric key, and a first ciphertext key obtained by encrypting the first symmetric key by using a first public key.

The decrypting the first encrypted data to obtain the user privacy data of the target user includes: decrypting the first ciphertext key by using a first private key corresponding to the first public key to obtain the first symmetric key; and decrypting the first ciphertext privacy data by using the first symmetric key to obtain the user privacy data.

Optionally, when the computer executable instructions stored in the storage medium are being executed by the processor, the generating second encrypted data based on the user privacy data includes: encrypting the user privacy data of the target user by using a second symmetric key to obtain second ciphertext privacy data; encrypting the second symmetric key by using a second public key to obtain a second ciphertext key; and generating second encrypted data based on the second ciphertext privacy data and the second ciphertext key.

Optionally, when the computer executable instructions stored in the storage medium are being executed by the processor, the recording the user privacy data in the TEE by using the first smart contract includes: decrypting the second ciphertext key in the TEE by using a second private key corresponding to the second public key and the first smart contract, to obtain the second symmetric key; decrypting the second ciphertext privacy data by using the second symmetric key to obtain the user privacy data; and storing the user privacy data to the TEE in the blockchain.

Optionally, when the computer executable instructions stored in the storage medium are being executed by the processor, after the decrypting the first encrypted data to obtain the user privacy data of the target user, the following is further included: if the security verification on the user privacy data fails, generating data abnormality prompt information indicating that the security verification fails, and sending the data abnormality prompt information to the data holder.

Optionally, when the computer executable instructions stored in the storage medium are being executed by the processor, after the recording the user privacy data in the TEE by using the first smart contract, the following is further included: obtaining data recording state information of the user privacy data; and if the data recording state information indicates that data recording fails, continuing to trigger and perform the step of recording the user privacy data in the TEE by using the first smart contract, or sending recording abnormality prompt information to a specified end-user device.

Optionally, when the computer executable instructions stored in the storage medium are being executed by the processor, the request body data includes a third ciphertext key, and the third ciphertext key is obtained by encrypting a third symmetric key by using a third public key.

The sending the encrypted target privacy data to the data consumer includes: decrypting the third ciphertext key by using a third private key corresponding to the third public key to obtain the third symmetric key; encrypting the target privacy data by using the third symmetric key to obtain the encrypted target privacy data; and sending the encrypted target privacy data to the data consumer.

Optionally, when the computer executable instructions stored in the storage medium are being executed by the processor, the performing predetermined verification on the data consumption request in the TEE based on request body data corresponding to the data consumption request by using a smart contract deployed in the blockchain, to obtain a corresponding predetermined verification result includes: transmitting the request body data corresponding to the data consumption request to the TEE in the blockchain, where a second smart contract is deployed in the blockchain; and performing predetermined verification on the data consumption request in the TEE based on the request body data by using the second smart contract, to obtain a corresponding predetermined verification result.

Optionally, when the computer executable instructions stored in the storage medium are being executed by the processor, the transmitting the request body data corresponding to the data consumption request to the TEE in the blockchain includes: encrypting the request body data corresponding to the data consumption request by using a fourth symmetric key to obtain ciphertext request body data; encrypting the fourth symmetric key by using a fourth public key to obtain a fourth ciphertext key; and transmitting the ciphertext request body data and the fourth ciphertext key to the TEE in the blockchain.

Optionally, when the computer executable instructions stored in the storage medium are being executed by the processor, the performing predetermined verification on the data consumption request in the TEE based on the request body data by using the second smart contract, to obtain a corresponding predetermined verification result includes: decrypting the fourth ciphertext key in the TEE by using a fourth private key corresponding to the fourth public key and the second smart contract to obtain the fourth symmetric key; decrypting the ciphertext request body data by using the fourth symmetric key to obtain plaintext request body data; and performing predetermined verification on the data consumption request based on the plaintext request body data to obtain a corresponding predetermined verification result.

Optionally, when the computer executable instructions stored in the storage medium are being executed by the processor, the performing predetermined verification on the data consumption request based on the plaintext request body data to obtain a corresponding predetermined verification result includes: verifying a data privacy attribute of the user privacy data corresponding to the data consumption request, to obtain a first verification result; verifying, based on a pre-stored data hosting record, whether a hosting relationship exists between a data hoster and a data holder of the user privacy data, to obtain a second verification result; verifying, based on a pre-stored data authorization record, whether an authorization relationship exists between the data consumer and the data holder, to obtain a third verification result; and determining, based on at least one of the first verification result, the second verification result, and the third verification result, the predetermined verification result obtained for the data consumption request.

Optionally, when the computer executable instructions stored in the storage medium are being executed by the processor, the user privacy data includes user behavior data used to indicate an education experience of the target user.

When the computer executable instructions stored in the storage medium in one or more embodiments of the present specification are being executed by the processor, the data consumption request sent by the data consumer is received, where the data consumption request is a consumption request aiming at user privacy data of a target user, the user privacy data includes personal data that is pre-encrypted and is uploaded to a TEE, and the TEE is constructed in the node of the blockchain. Predetermined verification is performed on the data consumption request in the TEE based on the request body data corresponding to the data consumption request by using the smart contract deployed in the blockchain, to obtain the corresponding predetermined verification result. If the predetermined verification result satisfies the verification success condition, the target privacy data obtained for the data consumption request is obtained, and the encrypted target privacy data is sent to the data consumer, where the target privacy data is obtained in the TEE based on the user privacy data stored in the blockchain. Either in the data recording stage of the user privacy data or the data consumption stage of the user privacy data, corresponding data processing is performed by using the TEE constructed in the node of the blockchain, and data is transmitted in a form of a ciphertext, to upload the user privacy data to the TEE of the blockchain, and return the target privacy data to the data consumer, thereby externally providing the consumption service of the user privacy data. As such, security of the user privacy data in the data transmission process can be ensured, and security of the user privacy data on which data processing is performed on the blockchain can also be ensured, thereby ensuring security of the user privacy data generated by the user in the specified industry on the entire record, and improving a security level of the user privacy data that is of the user and that is related to personal experience in the specified industry.

It is worthwhile to note that in the present specification, the embodiments of the storage medium and the embodiments of the blockchain-based user privacy data providing method are based on the same inventive idea, for specific implementation of the embodiments, references can be made to implementation of the previous corresponding blockchain-based user privacy data providing method. Repetitions are omitted for simplicity.

The previous content describes the specific embodiments of the present specification. Other embodiments fall within the scope of the appended claims. In some cases, the actions or steps described in the claims can be performed in a different order from that in the embodiments and still achieve desired results. In addition, the processes depicted in the accompanying drawings can achieve the desired results without necessarily requiring the shown specific order or sequence. In some implementations, multitasking and parallel processing are also possible or may be advantageous.

In the 1990s, the improvement on a technology can be clearly distinguished between hardware improvements (for example, improvements of circuit structures such as diodes, transistors and switches) or software improvements (improvements of method processes). However, as technologies develop, current improvements of many method processes can be considered as direct improvements to hardware circuit structures. Almost all designers program an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. A designer "integrates" a digital system to a single PLD through self-programming, without requiring a chip manufacturer to design and manufacture a dedicated integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the Very-High-Speed Integrated Circuit Hardware Description Language (VHDL) and Verilog are most commonly used. A person skilled in the art should also understand that a hardware circuit that implements a logical method process can be readily obtained provided that the method process is logically programmed by using several of the previously described hardware description languages and is programmed into an integrated circuit.

A controller can be implemented in any appropriate way. For example, the controller can be in a form of a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microcontrollers: ARC 625D, Atmel AT91SAM, Microchip PIC18F26K20, and Silicone Labs C8051F320. A memory controller can be further implemented as a part of control logic of a memory. A person skilled in the art also knows that, in addition to implementing the controller by using the computer-readable program code, method steps can be logically programmed to enable the controller to implement the same function in forms of a logic gate, a switch, an application-specific integrated circuit, a programmable logic controller, and a built-in microcontroller. Therefore, such a controller can be considered as a hardware component, and an apparatus that is included in the controller and configured to implement various functions can also be considered as a structure in the hardware component. Alternatively, the apparatus configured to implement various functions can even be considered as both a software module implementing a method and a structure in the hardware component.

The system, apparatus, module, or unit illustrated in the above embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is divided to various units based on functions for description when the previous apparatus is described. Certainly, when the one or more embodiments of the present specification is implemented, functions of the units can be implemented in one or more pieces of software and/or hardware.

A person skilled in the art should understand that the embodiments of the present specification can be provided as a method, a system, or a computer program product. Therefore, the one or more embodiments of the present specification can be in a form of hardware only embodiments, software only embodiments, or embodiments with a combination of software and hardware. In addition, the one or more embodiments of the present specification can be in a form of a computer program product that is implemented on one or more computer-usable storage media (including but not limited to a magnetic disk memory, a CD-ROM, an optical memory, etc.) that include computer-usable program code.

The embodiments of the present specification are described with reference to the flowcharts and/or block diagrams of the method, the device (system), and the computer program product according to the embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

Alternatively, these computer program instructions can be stored in a computer-readable memory that can instruct the computer or the another programmable data processing device to work in a specific way, so that the instructions stored in the computer-readable memory generate an artifact that includes an instruction apparatus. The instruction apparatus implements a specified function in one or more processes in the flowcharts and/or in one or more blocks in the block diagrams.

Alternatively, these computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

In a typical configuration, a computing device includes one or more processors (CPUs), input/output interfaces, network interfaces, and memories.

The memory may include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be computer-readable instructions, data structures, program modules, or other data. Examples of the computer storage medium include but are not limited to a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be configured to store information accessible to a computing device. As described in the present specification, the computer-readable medium does not include computer-readable transitory media such as a modulated data signal and a carrier.

It is worthwhile to note that the terms "comprise", "include", or any other variations term are intended to cover a non-exclusive inclusion, so that a process, a method, a product, or a device that includes a list of elements includes those elements and further includes other elements not expressly listed or inherent to such a process, method, product, or device. Without more constraints, an element preceded by "includes a . . . " does not preclude the existence of additional identical elements in the process, method, product, or device that includes the element.

A person skilled in the art should understand that the embodiments of the present specification can be provided as a method, a system, or a computer program product. Therefore, the one or more embodiments of the present specification can be in a form of hardware only embodiments, software only embodiments, or embodiments with a combination of software and hardware. In addition, the one or more embodiments of the present specification can be in a form of a computer program product that is implemented on one or more computer-usable storage media (including but not limited to a magnetic disk memory, a CD-ROM, an optical memory, etc.) that include computer-usable program code.

The one or more embodiments of the present specification can be described in the general context of a computer executable instruction executed by a computer, for example, a program module. Generally, the program module includes a routine, a program, an object, a component, a data structure, etc. executing a specific task or implementing a specific abstract data type. The one or more embodiments of the present specification can also be practiced in distributed computing environments. In the distributed computing environments, tasks are performed by remote processing devices connected through a communications network. In a distributed computing environment, the program module can be located in both local and remote computer storage media including storage devices.

The embodiments in the present specification are described in a progressive way. For same or similar parts of the embodiments, mutual references can be made to the implementations. Each embodiment focuses on a difference from other embodiments. Especially, a system embodiment is basically similar to a method embodiment, and therefore is described briefly. For a related part, references can be made to some descriptions in the method embodiment.

The previous descriptions are merely embodiments of the present specification, and are not intended to limit the present specification. A person skilled in the art can make various modifications and changes to the present specification. Any modification, equivalent replacement, improvement, etc. made without departing from the spirit and principle of one or more embodiments of the present specification shall fall within the scope of one or more of the claims of the present specification.

What is claimed is:

1. A blockchain-based user privacy data providing method, comprising:
   receiving a data consumption request sent by a data consumer, wherein the data consumption request is a consumption request that requests user privacy data of a target user, wherein the user privacy data comprises personal data that is pre-encrypted and is uploaded to a trusted execution environment (TEE), and the TEE is constructed in a node of a blockchain;
   performing predetermined verification on the data consumption request in the TEE based on request body data that corresponds to the data consumption request by using a smart contract deployed in the blockchain, wherein performing the predetermined verification comprises performing the predetermined verification on the data consumption request based on plaintext request body data to obtain a corresponding predetermined verification result, comprising:
      verifying a data privacy attribute of the user privacy data corresponding to the data consumption request to obtain a first verification result;
      verifying, based on a pre-stored data hosting record, whether a hosting relationship exists between a data hoster and a data holder of the user privacy data to obtain a second verification result, wherein the data hoster hosts the user privacy data for the data holder and the data hoster is at least one member in the blockchain, and wherein the pre-stored data hosting record includes a plurality of data hosting relationship records that are uploaded to the blockchain in advance based on an authorization agreement signed by the data holder and the data hoster;
      verifying, based on a pre-stored data authorization record, whether an authorization relationship exists between the data consumer and the data holder to obtain a third verification result; and
   determining, based on at least one of the first verification result, the second verification result, and the third verification result, the predetermined verification result obtained for the data consumption request;
   obtaining the corresponding predetermined verification result;
   in responding to determining that the predetermined verification result satisfies a verification success condition, obtaining target privacy data for the data consumption request, wherein the smart contract includes a verification constraint condition used to determine whether the predetermined verification result satisfies the verification success condition; and
   sending an encrypted target privacy data to the data consumer, wherein the target privacy data is obtained in the TEE based on the user privacy data stored in the blockchain.

2. The method according to claim 1, further comprising, before receiving the data consumption request sent by the data consumer:
   receiving a privacy data storage request of the target user that is sent by a data holder, wherein the privacy data storage request comprises first encrypted data, and the first encrypted data is obtained by encrypting plaintext user privacy data through envelope encryption;
   transmitting the user privacy data to the TEE in the blockchain based on the first encrypted data, wherein a first smart contract is deployed in the blockchain; and
   recording the user privacy data in the TEE by using the first smart contract.

3. The method according to claim 2, wherein transmitting the user privacy data to the TEE in the blockchain based on the first encrypted data comprises:
   decrypting the first encrypted data to obtain the user privacy data of the target user;
   determining whether security verification of the user privacy data obtained through decryption succeeds;
   in response to determining that the security verification of the user privacy data has succeeded, generating second encrypted data based on the user privacy data; and
   transmitting the second encrypted data to the TEE in the blockchain.

4. The method according to claim 3, wherein the first encrypted data comprises ciphertext privacy data obtained by encrypting the user privacy data by using a symmetric key, and a ciphertext key obtained by encrypting the symmetric key by using a public key; and
   wherein decrypting the first encrypted data to obtain the user privacy data of the target user comprises:
      decrypting the ciphertext key by using a private key corresponding to the public key to obtain the symmetric key; and
      decrypting the ciphertext privacy data by using the symmetric key to obtain the user privacy data.

5. The method according to claim 3, wherein generating the second encrypted data based on the user privacy data comprises:
   encrypting the user privacy data of the target user by using a symmetric key to obtain ciphertext privacy data;
   encrypting the symmetric key by using a public key to obtain a ciphertext key; and
   generating the second encrypted data based on the ciphertext privacy data and the ciphertext key.

6. The method according to claim 5, wherein recording the user privacy data in the TEE by using the first smart contract comprises:
- decrypting the ciphertext key in the TEE by using a private key corresponding to the public key and the first smart contract to obtain the symmetric key;
- decrypting the ciphertext privacy data by using the symmetric key to obtain the user privacy data; and
- storing the user privacy data to the TEE in the blockchain.

7. The method according to claim 3 further comprising, after the decrypting the first encrypted data to obtain the user privacy data of the target user:
- in response to determining that the security verification on the user privacy data has failed, generating data abnormality prompt information indicating that the security verification fails, and sending the data abnormality prompt information to the data holder.

8. The method according to claim 2, after the recording the user privacy data in the TEE by using the first smart contract, further comprising:
- obtaining data recording state information of the user privacy data; and
- in response to determining that the data recording state information indicates that data recording has failed, re-performing the step of recording the user privacy data in the TEE by using the first smart contract, or sending recording abnormality prompt information to a specified end-user device.

9. The method according to claim 1, wherein the request body data comprises a ciphertext key, and the ciphertext key is obtained by encrypting a symmetric key by using a public key; and
wherein sending the encrypted target privacy data to the data consumer comprises:
- decrypting the ciphertext key by using a private key corresponding to the public key to obtain the symmetric key;
- encrypting the target privacy data by using the symmetric key to obtain the encrypted target privacy data; and
- sending the encrypted target privacy data to the data consumer.

10. The method according to claim 1, wherein performing the predetermined verification on the data consumption request in the TEE based on the request body data corresponding to the data consumption request by using the smart contract deployed in the blockchain to obtain the corresponding predetermined verification result comprises:
- transmitting the request body data corresponding to the data consumption request to the TEE in the blockchain, wherein a second smart contract is further deployed in the blockchain; and
- performing the predetermined verification on the data consumption request in the TEE based on the request body data by using the second smart contract to obtain a the corresponding predetermined verification result.

11. The method according to claim 10, wherein transmitting the request body data corresponding to the data consumption request to the TEE in the blockchain comprises:
- encrypting the request body data corresponding to the data consumption request by using a symmetric key to obtain ciphertext request body data;
- encrypting the symmetric key by using a public key to obtain a ciphertext key; and
- transmitting the ciphertext request body data and the ciphertext key to the TEE in the blockchain.

12. The method according to claim 11, wherein performing the predetermined verification on the data consumption request in the TEE based on the request body data by using the second smart contract to obtain the corresponding predetermined verification result comprises:
- decrypting the ciphertext key in the TEE by using a private key corresponding to the public key and the second smart contract to obtain the symmetric key; and
- decrypting the ciphertext request body data by using the symmetric key to obtain the plaintext request body data.

13. A blockchain-based user privacy data providing apparatus, comprising at least one processor, one or more memories coupled to the at least one processor and storing programming instructions for execution by the at least one processor to cause the apparatus to perform one or more operations comprising:
- receive a data consumption request sent by a data consumer, wherein the data consumption request is a consumption request that requests user privacy data of a target user, wherein the user privacy data comprises personal data that is pre-encrypted and is uploaded to a TEE, and the TEE is constructed in a node of a blockchain;
- perform predetermined verification on the data consumption request in the TEE based on request body data that corresponds to the data consumption request by using a smart contract deployed in the blockchain, wherein performing the predetermined verification comprises performing the predetermined verification on the data consumption request based on plaintext request body data to obtain a corresponding predetermined verification result, comprising:
  - verifying a data privacy attribute of the user privacy data corresponding to the data consumption request to obtain a first verification result;
  - verifying, based on a pre-stored data hosting record, whether a hosting relationship exists between a data hoster and a data holder of the user privacy data to obtain a second verification result, wherein the data hoster hosts the user privacy data for the data holder and the data hoster is at least one member in the blockchain, and wherein the pre-stored data hosting record includes a plurality of data hosting relationship records that are uploaded to the blockchain in advance based on an authorization agreement signed by the data holder and the data hoster;
  - verifying, based on a pre-stored data authorization record, whether an authorization relationship exists between the data consumer and the data holder to obtain a third verification result; and
  - determining, based on at least one of the first verification result, the second verification result, and the third verification result, the predetermined verification result obtained for the data consumption request;
- obtain the corresponding predetermined verification result;
- in response to determining that the predetermined verification result satisfies a verification success condition, obtain target privacy data for the data consumption request, wherein the smart contract includes a verification constraint condition used to determine whether the predetermined verification result satisfies the verification success condition; and send an encrypted target privacy data to the data consumer, wherein the target privacy data is obtained in the TEE based on the user privacy data stored in the blockchain.

14. The apparatus according to claim 13, wherein the operations further comprise:
receive a privacy data storage request of the target user that is sent by a data holder, wherein the privacy data storage request comprises first encrypted data, and the first encrypted data is obtained by encrypting plaintext user privacy data through envelope encryption;
transmit the user privacy data to the TEE in the blockchain based on the first encrypted data, wherein a first smart contract is deployed in the blockchain; and
record the user privacy data in the TEE by using the first smart contract.

15. The apparatus according to claim 14, wherein the operations further comprise:
decrypt the first encrypted data to obtain the user privacy data of the target user;
determine whether security verification of the user privacy data obtained through decryption succeeds;
in response to determining that the security verification of the user privacy data has succeeded, generate second encrypted data based on the user privacy data; and
transmit the second encrypted data to the TEE in the blockchain.

16. The apparatus according to claim 15, wherein the first encrypted data comprises first ciphertext privacy data obtained by encrypting the user privacy data by using a first symmetric key, and a first ciphertext key obtained by encrypting the first symmetric key by using a first public key, and
wherein the operations further comprise:
decrypt the first ciphertext key by using a first private key corresponding to the first public key to obtain the first symmetric key; and
decrypt the first ciphertext privacy data by using the first symmetric key to obtain the user privacy data.

17. The apparatus according to claim 15, wherein the operations further comprise:
encrypt the user privacy data of the target user by using a symmetric key to obtain ciphertext privacy data;
encrypt the symmetric key by using a public key to obtain ciphertext key; and
generate the second encrypted data based on the ciphertext privacy data and the ciphertext key.

18. The apparatus according to claim 17, wherein the operations further comprise:
decrypt the ciphertext key in the TEE by using a private key corresponding to the public key and the first smart contract, to obtain the symmetric key;
decrypt the ciphertext privacy data by using the symmetric key to obtain the user privacy data; and
store the user privacy data to the TEE in the blockchain.

19. The apparatus according to claim 15, wherein the operations further comprise:
in response to determining that the security verification on the user privacy data has failed, generate data abnormality prompt information indicating that the security verification fails; and
send the data abnormality prompt information to the data holder.

20. The apparatus according to claim 14, wherein the operations further comprise:
obtain data recording state information of the user privacy data; and in response to determining that the data recording state information indicates that data recording has failed, re-performing the step of recording the user privacy data in the TEE by using the first smart contract, or send recording abnormality prompt information to a specified end-user device.

21. The apparatus according to claim 13, wherein the request body data comprises a ciphertext key, and the ciphertext key is obtained by encrypting a symmetric key by using a public key, and
wherein the operations further comprise:
decrypt the ciphertext key by using a private key corresponding to the public key to obtain the symmetric key;
encrypt the target privacy data by using the symmetric key to obtain the encrypted target privacy data; and
send the encrypted target privacy data to the data consumer.

22. The apparatus according to claim 13, wherein the operations further comprise:
transmit the request body data corresponding to the data consumption request to the TEE in the blockchain, wherein a second smart contract is deployed in the blockchain; and
perform the predetermined verification on the data consumption request in the TEE based on the request body data by using the second smart contract to obtain the corresponding predetermined verification result.

23. The apparatus according to claim 22, wherein the operations further comprise:
encrypt the request body data corresponding to the data consumption request by using a symmetric key to obtain ciphertext request body data;
encrypt the symmetric key by using a public key to obtain a ciphertext key; and
transmit the ciphertext request body data and the ciphertext key to the TEE in the blockchain.

24. The apparatus according to claim 23, wherein the operations further comprise:
decrypt the ciphertext key in the TEE by using a private key corresponding to the public key and the second smart contract to obtain the symmetric key; and
decrypt the ciphertext request body data by using the symmetric key to obtain plaintext request body data.

25. A blockchain-based user privacy data providing device, comprising:
at least one processor; and
one or more memories coupled to the at least one processor and storing programming instructions for execution by the at least one processor to perform one or more operations comprising:
receive a data consumption request sent by a data consumer, wherein the data consumption request is a consumption request that requests user privacy data of a target user, wherein the user privacy data comprises personal data that is pre-encrypted and is uploaded to a TEE, and the TEE is constructed in a node of a blockchain;
perform predetermined verification on the data consumption request in the TEE based on request body data that corresponds to the data consumption request by using a smart contract deployed in the blockchain, wherein performing the predetermined verification comprises performing the predetermined verification on the data consumption request based on plaintext request body data to obtain a corresponding predetermined verification result, comprising:

verifying a data privacy attribute of the user privacy data corresponding to the data consumption request to obtain a first verification result;

verifying, based on a pre-stored data hosting record, whether a hosting relationship exists between a data hoster and a data holder of the user privacy data to obtain a second verification result, wherein the data hoster hosts the user privacy data for the data holder and the data hoster is at least one member in the blockchain, and wherein the pre-stored data hosting record includes a plurality of data hosting relationship records that are uploaded to the blockchain in advance based on an authorization agreement signed by the data holder and the data hoster;

verifying, based on a pre-stored data authorization record, whether an authorization relationship exists between the data consumer and the data holder to obtain a third verification result; and determining, based on at least one of the first verification result, the second verification result, and the third verification result, the predetermined verification result obtained for the data consumption request;

obtain the corresponding predetermined verification result;

in response to determining that the predetermined verification result satisfies a verification success condition, obtain target privacy data for the data consumption request, wherein the smart contract includes a verification constraint condition used to determine whether the predetermined verification result satisfies the verification success condition; and send an encrypted target privacy data to the data consumer, wherein the target privacy data is obtained in the TEE based on the user privacy data stored in the blockchain.

\* \* \* \* \*